United States Patent
Frusina et al.

(10) Patent No.: US 11,589,289 B2
(45) Date of Patent: Feb. 21, 2023

(54) SYSTEM AND METHOD TO ADAPT COMMUNICATIONS RESPONSIVE TO ACTIONABLE INTELLIGENCE

(71) Applicant: DEJERO LABS INC., Waterloo (CA)

(72) Inventors: Bogdan Frusina, Kitchener (CA); Todd Schneider, Waterloo (CA); Cameron Kenneth Smith, Oakville (CA); Jonathon Oberholzer, Waterloo (CA)

(73) Assignee: DEJERO LABS INC., Waterloo (CA)

( * ) Notice: Subject to any disclaimer, the term of this patent is extended or adjusted under 35 U.S.C. 154(b) by 0 days.

(21) Appl. No.: 17/264,769

(22) PCT Filed: Jul. 30, 2019

(86) PCT No.: PCT/CA2019/051039
§ 371 (c)(1),
(2) Date: Jan. 29, 2021

(87) PCT Pub. No.: WO2020/024046
PCT Pub. Date: Feb. 6, 2020

(65) Prior Publication Data
US 2021/0297929 A1  Sep. 23, 2021

Related U.S. Application Data

(60) Provisional application No. 62/711,989, filed on Jul. 30, 2018.

(51) Int. Cl.
*H04W 40/34* (2009.01)
*H04L 45/24* (2022.01)
*H04N 7/18* (2006.01)

(52) U.S. Cl.
CPC ............. *H04W 40/34* (2013.01); *H04L 45/24* (2013.01); *H04N 7/185* (2013.01)

(58) Field of Classification Search
CPC ....... H04W 40/34; H04W 40/24; H04W 4/02; H04W 4/029; H04W 4/40; H04W 4/80;
(Continued)

(56) References Cited

U.S. PATENT DOCUMENTS 6,901,074 B1   5/2005   Yamasaki
8,249,546 B1   8/2012   Shah et al.
(Continued)

FOREIGN PATENT DOCUMENTS

CA         2981903 A1   10/2016

OTHER PUBLICATIONS

Canadian Intellectual Property Office (CIPO), International Search Report and Written Opinion for PCT/CA2019/051039, dated Oct. 1, 2019.
(Continued)

*Primary Examiner* — Atique Ahmed
(74) *Attorney, Agent, or Firm* — Norton Rose Fulbright Canada LLP

(57) ABSTRACT

Devices, systems, and methods are described that employ actionable intelligence in an emergency or other situation requiring immediate situational awareness, based on multiple types of input. Actionable intelligence is an output providing guidance or information that can be acted on to resolve an incident. The device can be configured to request re-allocation of resources based on incident severity, and bonding technology is used to provide improved speed and reliability in networking communications following a triggering event.

20 Claims, 14 Drawing Sheets

(58) Field of Classification Search
CPC ......... H04W 4/38; H04W 4/90; H04W 40/38; H04L 45/24; H04L 45/42; H04L 47/24; H04N 7/185
See application file for complete search history.

(56) References Cited

U.S. PATENT DOCUMENTS

| | | | |
|---|---|---|---|
| 9,752,840 B1 | 9/2017 | Betro | |
| 2001/0023187 A1* | 9/2001 | Wilhelm | H04W 4/06 |
| | | | 455/518 |
| 2002/0093965 A1* | 7/2002 | Ageby | H04L 12/43 |
| | | | 370/468 |
| 2003/0236074 A1* | 12/2003 | Ishii | H04B 1/7113 |
| | | | 375/E1.032 |
| 2004/0032847 A1* | 2/2004 | Cain | H04L 1/0041 |
| | | | 370/347 |
| 2004/0151141 A1* | 8/2004 | Proctor, Jr. | H04J 13/0022 |
| | | | 370/335 |
| 2015/0156082 A1* | 6/2015 | Kakadia | H04L 47/50 |
| | | | 709/223 |
| 2015/0373482 A1* | 12/2015 | Barnard | H04W 4/70 |
| | | | 370/338 |
| 2016/0163186 A1* | 6/2016 | Davidson | G06Q 50/06 |
| | | | 340/506 |
| 2016/0337261 A1 | 11/2016 | Chan et al. | |
| 2016/0365897 A1* | 12/2016 | Gross | H04L 63/18 |
| 2017/0251421 A1* | 8/2017 | Albasheir | H04L 47/18 |
| 2017/0268842 A1 | 9/2017 | Kennair, Jr. | |
| 2017/0347236 A1 | 11/2017 | Frusina et al. | |
| 2019/0149896 A1* | 5/2019 | Grammel | H04L 41/0654 |
| | | | 398/3 |
| 2020/0128470 A1* | 4/2020 | Mok | H04W 72/02 |
| 2020/0355457 A1* | 11/2020 | Deng | H04N 5/23203 |

OTHER PUBLICATIONS

European Patent Office (EPO), Extended European Search Report dated Mar. 16, 2022 to EP Application No. 19844521.5.

* cited by examiner

SYSTEM AND METHOD TO ADAPT COMMUNICATIONS RESPONSIVE TO ACTIONABLE INTELLIGENCE

CROSS REFERENCE TO RELATED APPLICATIONS

This application is a non-provisional of, U.S. Application No. 62/711,989, entitled "SYSTEM AND METHOD TO ADAPT COMMUNICATIONS RESPONSIVE TO ACTIONABLE INTELLIGENCE", filed 30 Jul. 2018 and also a continuation-in-part application of U.S. patent application Ser. No. 16/023,406, entitled "A SYSTEM AND METHOD FOR TRANSMISSION OF DATA FROM A WIRELESS MOBILE DEVICE OVER A MULTIPATH WIRELESS ROUTER", filed on 29 Jun. 2018, which is a continuation of U.S. application Ser. No. 14/616,060, filed Feb. 6, 2015, which is a continuation of U.S. application Ser. No. 14/114,984, filed Oct. 31, 2013, which is the National Stage of International Application No. PCT/IB2013/000690, filed Apr. 16, 2013; which is a continuation-in-part of U.S. application Ser. No. 13/446,825, filed Apr. 13, 2012, which is a continuation-in-part of U.S. application Ser. No. 13/183,652, filed Jul. 15, 2011, which claims the benefit of U.S. Provisional Application No. 61/364,598, filed Jul. 15, 2010. The contents of each of these related applications are hereby incorporated by reference.

FIELD

Embodiments of the present disclosure generally relate to the field of network connectivity, and more specifically, embodiments relate to devices, systems, and methods for automatically prioritizing or deprioritizing communications responsive to triggers determined based on one or more data points that constitute an event or a potential event.

INTRODUCTION

The ability to have actionable intelligence in an emergency or other situation requiring immediate situational awareness, based on multiple types of input, is an area of growing need in an era of increased scrutiny of police/civilian interaction.

Existing solutions rely on the sending of relatively small amounts of simple data across a single connection for central processing. In some cases, the data flow is one way, with the primary action of the Internet of Things (IoT) endpoint device being to alert a central service of a condition. Even in cases of two-way data flow, the instructions back to the IoT endpoint device are simple, and based solely on fixed rules relating solely to that specific endpoint, with no analysis of other endpoints which may be related to a larger incident.

Actionable intelligence benefits from electronic communications ability. However, stable, reliable connection links are not always available or congested by use by other parties, including, for example, other, lower-priority communications associated with the individual. For example, a police vehicle may be transmitting video feeds continuously, or sending warrant request data or receiving a firmware update from a base station, resulting in bandwidth not being available when the police officer is engaging a suspect.

SUMMARY

Devices, systems, and methods are described that employ actionable intelligence in an emergency or other situation requiring immediate situational awareness, based on multiple types of input, such as data from an event or incident.

Actionable intelligence may refer to an output by the system that provides guidance or specific information to a person, whereby the person can act on the information provided by the output to resolve an incident. While policing is an immediate application, the technology disclosed herein could apply to any number of related areas, including but not limited to ambulance services or health-care, military, and general security, amongst others.

In a first aspect, there is a computer system provided for dynamically modifying multi-path routing communication pathways responsive to a triggering event, according to an embodiment. Corresponding computer programs (e.g., non-transitory computer readable media storing machine interpretable instructions for execution by a processor) and methods are also contemplated. The system can include a sensor communications receiver in electronic communication with sensors that is configured to periodically receive data sets related to detected events, the detected events representative of a triggering event. The data sets include data values which, for example, can indicate the triggering event through having a value beyond a threshold, or a combination of values which together cause an aggregated value beyond a threshold. For example, a holster may have a magnetic sensor indicative of an open/close status of a flap that secures a weapon. When the flap is opened, a Boolean value may be modified, the Boolean value associated with the triggering event (e.g., toggles isWeaponDrawn field).

Accordingly, the system associates the sensed data set with the triggering event, and thus determines that the event has occurred, triggering an adaptation of multi-path communication pathways to re-route and re-prioritize communications for the officer's body camera. Other types of triggering events are possible, for example, when a police vehicle speeds above a particular velocity, or experiences an abrupt acceleration (e.g., perhaps indicative that the vehicle has been hit).

Other sensors can include emergency light activation sensors, a switch directly associated with requesting prioritized resources (e.g., useful where emergency light activation would give away a position of the officer), a personal monitoring device (e.g., a heart-rate sensor), a distress signal (e.g., emergency beacon), a friend or foe identification transponder, a particle detector (e.g., Geiger counter), gyroscope/accelerometer, among others.

The data sets can include raw data, which can be processed to determine that a detected event has occurred. The detected event, for example, can be the removal or placement of a weapon into a weapons rack/holster, the activation/de-activation of vehicular lighting, the toggling of a switch explicitly indicating the need for prioritized communications, etc.

Actionable intelligence can be used as a triggering mechanism and utilized to establish electronic communication pathways in anticipation of a high-priority or very important communication channel (or channels) being required. Actionable intelligence is by its very nature time-sensitive, and is effected by a combination of data and logical mechanisms that are activated in accordance with one or more processes to provision sufficient connectivity resources across smart blended connectivity.

The system includes a network communications controller device having a processor and adapted for communication with the sensor communications receiver. The network communications controller determines, a required increase or decrease in communications performance relative to current communications performance for a target device; and provisions the increase or decrease in communications performance by modifying one or more data routing paths associated with one or more other networked devices to prioritize communications between the target device and a communications station.

Modifying of the data routing paths can include re-allocating network links previously allocated to the other networked devices and using the re-allocated network links for multi-path routing between the target device and the communications station. The modifying of the data routing paths can include, for example, modifying assignments of error control roles and data transmission roles of the network links.

The other network devices can include a portable cellular router (e.g., a vehicle may have a cellular hotspot), the portable cellular router electronically coupled to the target device through a local area network connection; and the data routing paths associated with the cellular router can be assigned error control roles, for example, to improve an overall throughput of the signal to/from the target device to the communications station.

The modifying of the data routing paths associated with other networked devices can further include temporarily disabling communications from a subset of the other networked devices by re-allocating an entirety of the corresponding network links of the subset of the other networked devices to the target device.

The modifying of the data routing paths associated with other networked devices can include transmitting a data message to cellular base stations including electronic instructions to re-allocate cellular communications vectors to provide the increased communications performance. This is useful where there may be clogged cellular networks, for example, due to a parade.

The required increase in communications performance can be designated for target locations based on a route of a vehicle stored in electronic memory, and the modifying of the data routing paths associated with other networked devices to prioritize communications between the target device and the communications station can be pre-emptively conducted at the target locations while the vehicle is moving to the target locations, effectively clearing a communications path as the vehicle progresses along the route.

The required increase in communications performance can be designated for a route of a vehicle or a person stored in electronic memory, and the modifying of the data routing paths associated with other networked devices to prioritize communications between the target device and the communications station includes modifying the data routing paths corresponding to subsets of the other networked devices that are proximate to the vehicle or the person while the vehicle or the person is traversing the route.

The sensors can, for example, include at least one of a weapon securement device sensor or an emergency vehicle lighting activation sensor, and the target device includes at least one of a body camera, an identification friend or foe transponder, or a dashboard camera. Other example embodiments are possible, for example, where the system is being used in relation to a sports event, at concerts, military, search, or search and rescue operations, among others.

The sensors, in some embodiments, can be cameras, microphones, or other recording devices.

In some embodiments, the target device is adapted to record both a low bandwidth data stream and a high bandwidth data stream, and the the low bandwidth data stream being transmitted through the data routing paths by the target device and the high bandwidth data stream being stored on local data storage or local computer memory.

In some embodiments, the processor is configured to generate a mapping of existing available communication links at a given location or set of locations and store the mapping in a data structure, the data structure being an array or a linked list, for example. Characteristics of the available communication links can be stored thereon including, for example, signal strength, packet loss, latency, type, expected throughput, frequency band/channel, available overage, expandability/controllability, carrier, among others. In particular, certain networks may be flagged as controllable (for example, operated by a friendly carrier) such that bandwidth allocations or other characteristically can be modified by sending a signal to the base station requesting more resources. Bulk data transfer may be prioritized across these networks.

Conversely, where a communication link is suspect or less control is available, the communication link can be assigned only error control functions (e.g., sending parity bits, error correction codes) as there may be potential third parties eavesdropping on the signal and a ramp up in data transfer could provide an unwanted indication of increased emergency services activities. However, the communication link may still be useful for a limited set of functionality, especially where connection quality amongst the other available connections is poor. Suspect connections can include connections where snooping or eavesdropping is likely, for example, through a suspiciously strong signal from a nearby cellphone tower that is above what should be expected given the distance and normative traffic levels (e.g., a "Stingray").

Existing communication pathways can be appropriated (re-assignment) or new pathways can be opened (e.g., an expensive satellite connection). Differing priorities can be established (channel can be designated as having a super priority in terms of congestion management). Furthermore, error control functions and congestion control functions can be modified to improve throughput or other response characteristics.

It is desirable to have the ability to employ actionable intelligence in an emergency or other situation requiring immediate situational awareness, based on multiple types of computer-interpretable input. Actionable intelligence and situational awareness can be detected through monitored information, for example, as extracted from sensors, GPS units, radio usage, intercepted electronic signals, among others. As described in various embodiments, communications need to be reliable and sufficiently strong in relation to an event or at times proximate to the event such that information can be captured and acted upon. Furthermore, events are often chaotic, unplanned, and in unpredictable spectral environments.

Accordingly, embodiments described herein are triggered automatically based on sensed data.

An example event is an unexpected encounter between a police officer and a suspect. During this encounter, the police officer may be wearing a body camera which is configured to transmit data wirelessly capturing specifics of the encounter.

The body camera may have limited storage, and may need to transmit data that is recorded either at a data intermediary, such as storage residing proximate to the police vehicle, or at an off-site storage. However, there may not be sufficient communication resources in a typical scenario between the body camera and where it needs to transmit the data. Accordingly, a trade-off may need to be made, and the quality of the video transmitted by the body camera may be reduced, impacting the integrity of the video in further analysis, for example, in courtroom proceedings. Storing information locally without transmission also exposes the storage to tampering, erasure, or destruction.

An improved networking communications controller device and corresponding computer implemented methods for improving networked communications is described in embodiments herein for use in ensuring reliable and strong communications such that actionable intelligence can both be captured and acted upon. Depending on the priority and/or severity of an event or potential event, which may be set automatically, through a set of rules applied to one or more data points, or manually, the improved networking communications controller device can transmit control signals to re-prioritize data transmissions across existing communication links. In some embodiments, additional communications resources can be obtained (e.g., requesting the use of an expensive satellite connection), or existing communication resources being used for other purposes may be supplanted or re-scheduled.

The improved networking communications controller device is adapted to use bonding technology to automatically provide improved speed and reliability in networking communications following a triggering event. This improved communications capability is used in a manner that is responsive to triggering events, permitting costs to be minimized and resources, such as satellite signals, to be shared and prioritized according to real-time need.

As an illustrative, non-limiting example, a police officer may arrive on location in respect of a burglary call. Upon the officer's vehicle or smartphone GPS noting that the officer has arrived on location, an initial triggering event has been satisfied. The networking communications controller device starts increasing allocations of communication resources to the officer's vehicle's on-board computers, as well as to the body-camera, smartphone, or other devices that require communications. Other non-essential or lower priority communication functions may be suppressed or delayed (e.g., the transmission of a signal of fuel capacity and tire-pressure on the police vehicle, indicative of a need for routine maintenance, may be delayed). On a shared resource like a satellite, a centralized controller may shape or throttle other non-essential communications from other locations to increasing allocations of communication resources to those devices that require the resources.

The officer identifies the presence of a potential suspect on scene, and draws his weapon from an intelligent holster. The holster automatically transmits a signal indicative that the weapon has been withdrawn, and the networking communications controller device receives this signal and further increases allocations of communication resources by, for instance, causing the quality of video transmission from the scene of the incident to improve from low frame rate, low resolution previews to a high resolution, full frame rate video stream. As the officer approaches the suspect, the body-camera (or other communications equipment) is supported with maximum (or greater) available communication resources (or at least meeting an elevated threshold, full frame rate, or a set of higher communication standards). Other triggers are possible, such as the engaging of a siren, etc. The frame rate and/or resolution of dash cam video may improve, for example.

When the officer is able to de-escalate the situation, the officer returns the weapon to the holster. Accordingly, a signal can be generated at that time that the communications resources may be de-escalated to a lower level, and when, for example, the officer enters the vehicle and leaves the scene, the GPS position of the vehicle is tracked and the networking communications controller device returns the level of communications resources to a normal level.

Other contexts and applications are contemplated, for example, military applications, and non-emergency situations, such as when an officer is engaged in a scheduled but potentially dangerous activity, such as transporting offenders, etc.

Similarly, the implementation is not limited to a first responder implementation. As described further below, other potential implementations exist where there may be short term need of increased communication resources. For example, if an aircraft is determined to be deviating from a flight path, additional communication resources may be automatically assigned to help ensure that communications can be maintained.

The controller device includes circuitry adapted to provide a connection manager circuit that generates and transmits control signals that modify the operation of communication interfaces. The controller device, in some embodiments, is an improved networking router, or a special purpose computing device including processors, controller circuits, computer-readable memory, and data storage. The controller device, in some embodiments, includes computer memories storing one or more communication buffers for receiving for storing data packets for forwarding to a destination computing device or receipt from a destination computing device. Utilizing more than one communication linkage for multiple simultaneous data connections is described in Applicant's application Ser. No. 14/360,372, incorporated herein by reference. Utilizing communication buffers that are configured for packet routing for forwarding to a destination computing device (or vice versa) is described in Applicant's application Ser. Nos. 12/499,151 and 14/341,057, incorporated herein by reference.

The communication interfaces, in cooperation with other communication devices, provide one or more connections, which may have heterogeneous networking communication characteristics. The connection manager circuit, responsive to data packets received in relation to an incident (e.g., data packets representative of data, events, information, etc.) modifies the communication characteristics to re-prioritize and/or modify how the one or more connections are used to communicate information.

In some embodiments, the one or more connections have tunable or modifiable characteristics, which can be triggered to increase, for example, a bandwidth, to reduce a latency, among others. Additional channels may be added, technologies used for multiplexing/de-multiplexing may be modified, etc.

The present disclosure relates to a system incorporating the improved networking communications controller device that responds to data from events or incidents, the system comprising of a rules engine and a connection manager. The connection manager and rules engine can be a single entity or may be separate in virtual or physical locations, and may operate under different parameters depending on its situation or inherent capabilities. The connection manager and rules engine, separately or as one entity, may be located locally, at the scene of an incident, centrally, or remotely. In a preferred embodiment, the system is a device including different hardware circuitry that are provided in a single device. In another embodiment, the system is a set of software modules and hardware devices that are electronically coupled to one another and do not necessarily reside within the same device.

An event comprises of one or more data points taken together. An incident comprises one or more events, and an event may form part of one or more incidents. The present system may declare that an event or set of events constitutes an incident by way of an automatic process or manual input. The severity and/or priority of the incidents may be set automatically, through a set of rules applied to one or more data points, or manually.

In one aspect, an incident timeline may be created based on data collected and transmitted from an incident. The incident timeline may be produced in real-time or after the fact, and it can be edited or annotated, with such edits or annotations being tracked.

In another aspect, an artificial intelligence analysis, including facial recognition, audio/semantic analysis, and intelligent search, may be engaged to create an incident timeline by fusing data collected and transmitted from different sources of data related to an incident, for example, from various sensors. The fusion of data may be completed in real-time or after the fact. The incident timeline may be edited or annotated, with such edits or annotations being tracked.

In another aspect, an artificial intelligence analysis engine, including facial recognition, audio/semantic analysis, and intelligent search, may be engaged to conduct an analysis on the incident timeline to determine if gaps in the incident timeline, or in views of a particular moment in time, could be identified. Based on the analysis, data collected and transmitted from different sources of an incident may be fused to complete gaps identified by the artificial intelligence analysis engine with existing information, information which should be sought by other investigative means, or information from events that may have occurred prior to the start of the incident.

In another aspect, the system is configured to apply an artificial intelligence engine that is configured to generate computer-aided predictions of possible outcomes of the incident in real-time or to mine the data to offer recommendations for improvements to incident responding protocols. The system may use an artificial intelligence analysis engine to recommend and/or requisition a particular resource be available in an incident, based on a prediction of how the events in the incident timeline have played out in previous incidents.

For example, the artificial intelligence analysis engine may recommend that a drone be sent to a particular location to provide a view of an incident not otherwise available, or to the location of an expected incident, for instance the predicted end point of a car chase. A further example may be the artificial intelligence analysis engine predicting the type of equipment or resource best suited to respond to a particular incident, such as predicting the need for a bomb sniffing dog or bomb robot where an explosive device is involved in the incident, or recommending the use of a particular form of non-lethal weapon based on an assessment of what a suspect is wearing. In a specific example, the drone identifies that a bomb-planting suspect is wearing a gas mask (e.g., using machine learning). Accordingly, a non-lethal mechanism is automatically selected, and a control system selects a taser rather than tear gas due to the presence of the gas mask. In another specific example, a camera detects that a suspect may have at some point in the incident carried a weapon that appears to be legitimate, and thus an officer may wish to engage the suspect with extreme caution, even if a weapon is not visible on the scene.

In another aspect, the present system may also use an artificial intelligence analysis engine to determine whether gaps in data exist in the timelines of incidents located in particular areas, and may recommend changes to communication networks or may identify locations suitable for additional fixed communication devices, such as surveillance cameras. The artificial intelligence analysis engine may also be used to analyze and compare events to standard workflows or similar past events to extract statistics and insights that can drive workflow improvements and opportunities for training improvements for staff in the field.

The system may make one or more views of an incident available at various endpoints, such as command centres. The contents of each the incident view, or the priority given to each the incident view may be determined manually or by a set of rules in real-time. In another embodiment, the system may make one or more views of an incident available for viewing on the monitor of the officer's squad car, or on the officer's cellphone, potentially through the use of a cellular application. The command centre can further include a surveillance van having multiple viewports or screens that are able to provide feedback or control signals. Applicant's U.S. application Ser. No. 14/329,112 describes some example embodiments for providing viewing and control mechanisms, incorporated herein by reference.

Other aspects and features of the embodiments herein will become apparent to those ordinarily skilled in the art upon review of the following description of specific embodiments in conjunction with the accompanying figures.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
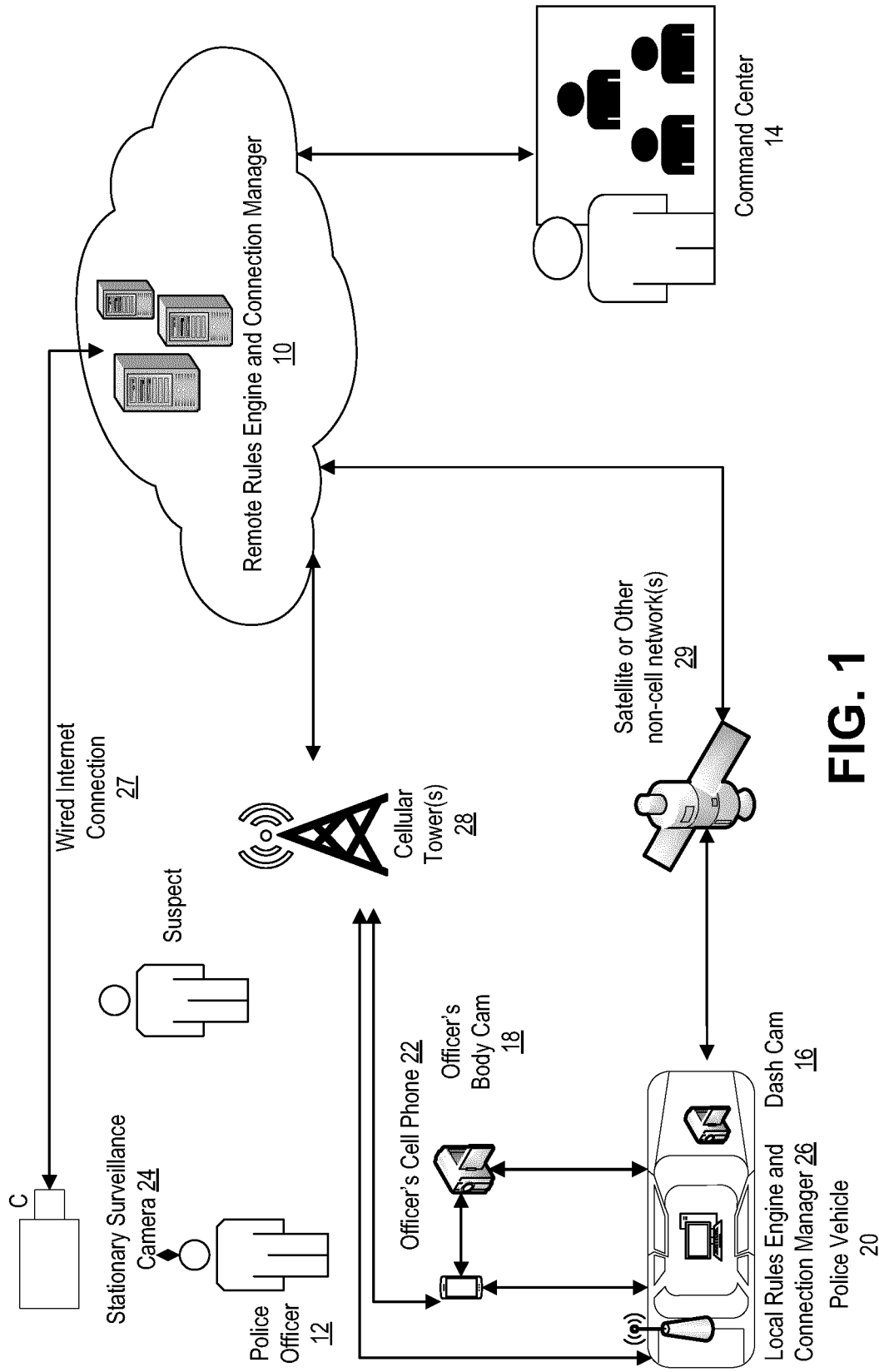
FIG. 1 is a block schematic diagram relating to an example scenario in which the rules engine and connection manager responds to events or incidents following a police-related occurrence, according to some embodiments.

This disclosure relates to a system for employing actionable intelligence in an emergency or other situation requiring immediate situational awareness, based on multiple types of input. Actionable intelligence may refer to an output by the system that provides guidance or specific information to a person, whereby the person can act on the information provided by the output to resolve an incident.

A computer system is provided for dynamically modifying multi-path routing communication pathways responsive to a triggering event, according to an embodiment. Corresponding computer programs (e.g., non-transitory computer readable media storing machine interpretable instructions for execution by a processor) and methods are also contemplated. The system can include a sensor communications receiver in electronic communication with sensors that is configured to periodically receive data sets related to detected events, the detected events representative of a triggering event. The data sets can include raw data, which can be processed to determine that a detected event has occurred. The detected event, for example, can be the removal or placement of a weapon into a weapons rack/holster, the activation/de-activation of vehicular lighting, the toggling of a switch explicitly indicating the need for prioritized communications, etc.

Existing solutions rely on the sending of relatively small amounts of simple data across a single connection for central processing. Current challenges with existing solutions include: varying signal and spectral environments, unreliable hand-offs between signal towers, signal drops, limited availability of cellular signals, limited capacity of individual network paths, and possibly unreliable networks.

The present disclosure provides a system that is configured to intelligently and adaptively combine a variety of communication links available nearby the scene of an incident. The available links may be intelligently and adaptively allocated based on consideration of the severity and priority of an incident, determined by an analysis of the data received from the incident. In some embodiments, the communication links are bonded (aggregated) together or de-bonded, such that multiple communication links are used for transmitting the same data, for instance, broken into portions of packets or individual packets for re-construction at a receiving computing entity.

The bonding/aggregation is not limited to simply using all the communication links for transmission, rather, intelligent bonding/aggregation techniques can be utilized such that the communication links cooperate with one another to improve the overall transmission (e.g., five communication links being used for transmission, while the fastest communication link is used both for transmission and error control packet transmission; or using bonding/aggregation to control the quality of video transmission from the scene of the incident and potentially improve the quality from a low frame rate, low resolution previews to a high resolution, full frame rate video stream, based on an assessment of the severity of an incident).

Actionable intelligence can be used as a triggering mechanism and utilized to establish electronic communication pathways in anticipation of a high-priority or very important communication channel (or channels) being required. Actionable intelligence is by its very nature time-sensitive, and is effected by a combination of data and logical mechanisms that are activated in accordance with one or more processes to provision sufficient connectivity resources across smart blended connectivity.

The system comprises a rules and connection manager, which may be one entity or separate entities in separate virtual or physical locations. The rules and connection manager responds to events or incidents and to real-time network conditions. The rules and connection manager is, in some embodiments, a physical circuit and may include processors, computer readable memory, and various interface connections.

An event is comprised of one or more data points taken together. An incident contains one or more events, and may contain additional data points. An event may form part of one or more incidents. The determination that an event or set of events constitutes an incident might involve an automatic process, or may be manually declared either at the scene of an incident or at some other location, such as a command center.

Examples of data points include audio and/or video recording from a camera, such as a dash cam or an officer's body cam; GPS info from a vehicle, such as a police vehicle; or a police officer's cell phone or other location device; sensor data, such as information indicating that a gun was removed from a holster; vehicle status data such as engine data, tire pressure, lights and sirens being turned on or off; and a police officer's health status, including, but not limited to pulse, blood pressure, or stress levels as measured by, for example, voice analysis.

The term "resources" used throughout, refers to data resources and includes the sources of at least the data points described above, unless otherwise specified.

Determinations regarding how to transmit and receive data are made by a connection manager, based on logic stored thereon. The connection manager controls the processes involved in deciding which communications paths should be used to, from and between the various endpoints, systems and devices. Such choices may involve the bonding of two or more communications channels, dynamic assignment of roles to communications channels or links, adding, re-prioritizing, or re-purposing communications channels, among others.

Decisions about which data to request, transmit or display can be made by a rules engine at various locations, such as locally, at the scene of the incident, or at a central command or cloud based rules engine. Rules engines may exist in a hierarchy, in which the scope of decision-making of the various engines is based on a set of rules. For instance, where conflicts between the rules engines exist, or where the communication between a local connection manager and rules engine and a remote connection manager and rules engine is disrupted, such conflicts or disruptions may be resolved through a set of rules or through manual intervention.

In one embodiment, such as the case of a larger scale incident involving multiple police patrol vehicles and mobile command vehicles, a local long range WiFi network is established based on a hierarchy of rules. In this example, there could be a hierarchy of local rules engines with the patrol vehicle rules engines feeding data over WiFi to the local rules engine in the mobile command vehicle, and the mobile command vehicle feeding data to the remote rules engine.

A hierarchy can be represented as a data structure storing logical conditions establishing routing tables and network characteristics and priorities. For example, the hierarchy may be flexible and dynamically applied as a situation changes based on actionable intelligence as ascertained based on triggering information. The hierarchy may further determine the types of communications resources that are activated and/or requested. Corresponding communication links and channels may be provisioned, and in some cases, additional resources are requested and bonding circuitry is utilized to obtain a requisite bandwidth or throughput (or any other desired communications features).

In another embodiment, the rules engines are adapted to enable viewing of local data over WiFi, including live or recorded video streams in cases where bandwidth is limited or to minimize satellite costs. This allows local commanders and officers to view detailed data and high quality video locally regardless of the bandwidth available to the WiFi and the central or remote rules engine.

One or more connection managers may interact with one or more rules engines, and the corresponding rules engine which they interact with may change in real-time in concert with changes in the environment related to the incident. Changes in the environment may include the location of various engines, the capacity of the various engines, or availability and capacity of various communication links.

A connection or rules engine may operate under different parameters depending on its situation or inherent capabilities. For example, a connection manager and rules engine on a vehicle may be limited to making decisions for a specific set of devices or endpoints associated with the vehicle or officers connected to that vehicle, whereas a remote communications manager or rules engine may have decision-making power for many more communications devices, and may make different decisions based on what is occurring in real-time across the range of devices.

The rules engine and connection manager may be located locally (at the scene of an incident), central, or remotely.

FIG. 1 is a block schematic diagram of an example scenario in which the local, central or remote rules engine and connection manager 26, 10 may respond to events 32 or incidents 36 following a police-related occurrence.

The connection manager is a network communications controller device having a processor and adapted for communication with a sensor communications receiver.

The connection manager 26 or 10 determines, a required increase or decrease in communications performance relative to current communications performance for a target device; and provisions the increase or decrease in communications performance by modifying one or more data routing paths associated with one or more other networked devices to prioritize communications between the target device and a communications station. For example, communications pathways can be obtained as between a recording device (if the device has connections thereof), cellular towers, or available satellite/microwave links thereof.

The communication links, in response to the trigger, have their data routing paths modified, and modifying of the data routing paths can include re-allocating network links previously allocated to the other networked devices and using the re-allocated network links for multi-path routing between the target device and the communications station.

The modifying of the data routing paths can include, for example, modifying assignments of error control roles and data transmission roles of the network links.

The other network devices can include a portable cellular router (e.g., a vehicle may have a cellular hotspot) (e.g., the communications device located on a police vehicle 20), the portable cellular router electronically coupled to the target device through a local area network connection; and the data routing paths associated with the cellular router can be assigned error control roles, for example, to improve an overall throughput of the signal to/from the target device to the communications station. Communications, for example, may be routed in accordance with approaches described in U.S. application Ser. No. 14/360,372 (granted as U.S. Pat. No. 9,357,427, incorporated herein by reference), in relation to resending of dropped packets or Forward Error Correction, or padding/duplication of packets on a second channel (or multiple other channels, not always limited to just two channels). Audio info and real-time telemetry data (information that needs to be acted on at the receiving end in a timely fashion, not just logged for later processing) could similarly use this mechanism.

For example, the system may send error control (FEC data) as padding on the main channel, and sends i-frames as back-up on a different channel, or the tracks the types of packets that are tending to be dropped, and infers from that a "smart sampling" of packets to duplicate (or amount of FEC data to generate and send) on the second channel and the speed required to make that channel effective for error control. The decision to get more aggressive with pathway specialization may be related to the severity of the incident. (e.g., the system may grab priority channels on the cell tower to send FEC data upon a holster pull, since it will be crucial that no data is lost from the events that follows. In another embodiment, video is sent over cell via body-cam until an event triggers, at which point the body cam switches to wireless (e.g., 802.11x) and sends to the squad vehicle communication device, which (when stationary), deploys a satellite dish (e.g., a mini-satellite), and handles the core video, with the body-cam sending an occasional i-frame, or other duplicate packets via cellular on a best-efforts basis.

The modifying of the data routing paths associated with other networked devices can further include temporarily disabling communications from a subset of the other networked devices by re-allocating an entirety of the corresponding network links of the subset of the other networked devices to the target device. This, for example, could reduce an ability of suspects or other users to communicate using the corresponding network links.

The modifying of the data routing paths associated with other networked devices can include transmitting a data message to cellular base stations including electronic instructions to re-allocate cellular communications vectors to provide the increased communications performance. This is useful where there may be clogged cellular networks, for example, due to a parade. Re-allocation of cellular communications vectors can include the clearing or provisioning of specific cellular communications channels in accordance with a modulation scheme being used (e.g., CDMA, TDMA, FDMA).

The required increase in communications performance can be designated for target locations based on a route of a vehicle stored in electronic memory, and the modifying of the data routing paths associated with other networked devices to prioritize communications between the target device and the communications station can be pre-emptively conducted at the target locations while the vehicle is moving to the target locations, effectively clearing a communications path as the vehicle progresses along the route.

In the example scenario in FIG. 1, multiple police officers 12 may arrive at the scene of a police-related occurrence. Each police officer 12 may carry multiple sources of relevant data 30 and have multiple means of sharing or transmitting the data 30 amongst themselves or with others at the scene and with command centres 14.

The declaration that an event 32 or set of events constitutes an incident 36 might involve an automatic process, such as the police officer 12 turning on warning lights and sirens, or may be manually declared either at the scene or at some other location, by either a police officer 12 or someone at a command center 14. In some embodiments, an artificial intelligence analysis engine 80 may be employed to analyze data from an event 32 or set of events and automatically declare whether the event 32 or set of events constitutes an incident 36. The artificial intelligence analysis engine 80 is a trained neural network implemented on a computer and having the ability to progressively self-improve (i.e., "learn").

Once an incident 36 is declared, other data 30, such as footage from stationary surveillance cameras 24 nearby the location of the police vehicle 20 or the location to which the officer had been dispatched, or video data from the officer's body cam or dash cam, may be requested by the local 26, central, or remote 10 rules engine and connection manager. Such requests may be made manually, manually based on suggestions provided by the system, or automatically based on a set of rules. In some embodiments, an artificial intelligence analysis engine 80 may be employed to analyze the severity and/or priority of an event and automatically request the reallocation of resources.

Incidents 36 may have different severities and/or priorities. The severity and/or priority of incidents 36 may be set automatically, through a set of rules applied to one or more data 30 points, or manually, such as via a police officer's declaration of the severity and/or priority. These severities and/or priorities may change in real-time during or after the incident 36 or event 32, based on an analysis of additional data 30. The priority of a given incident 36 may change in real-time due to other incidents 36 beginning, ending, or escalating.

The priority and/or severity of an event 32 may lead to changes in the behaviour and management of connections, including but not limited to wired internet connections 27, cellular tower 28 connections, or satellite and other non-cellular network connections 29, via the local 26, central, or remote 10 rules engine and connection manager, and to the location and/or re-allocation of computing power and resources to assist in resolving the incident 36. In some embodiments, the primary driver behind such adjustments to the behaviour and management of connections is cost.

In some embodiments, the priority or severity of an event 32 may also lead to the prioritization of data 30 based on event 32 priority and/or severity, which dictates how connections are assigned, re-routed and used.

In other embodiments, the priority or severity of an event 32 may also result in changes to the data 30 that is sent to and from the location of an incident 36. For example, the system may use bonding/aggregation to control the quality of video transmission from the scene of the incident and potentially improve the quality from a low frame rate, low resolution previews to a high resolution, full frame rate video stream, based on an assessment of the severity of an incident 36.

For instance, higher priority incidents 36, such as a robbery in progress, might require more communications and computing resources for devices and data 30 related to it than a lower priority incident 36, such as a report of vandalism that has already occurred.

In one embodiment, the local 26, central or remote 10 rules engine and connection manager, being aware of multiple incidents 36 in an area or within a group of common resources, such as a team of police officers, may not only directly request that more resources be allocated to the higher priority incidents 36, but may also directly reduce the amount of shared resources (e.g., a satellite connection) available to incidents 36 of lower priority so as to ensure availability of resources for the primary high priority incidents 36.

In some embodiments, the local 26, central or remote 10 rules engine and connection manager may directly reduce the amount of unmanaged resources (e.g., a cellular network) available to incidents 36 of lower priority so as to control or reduce costs.

In another embodiment, declaration of an incident 36 may lead to further data 30 being collected, stored and/or transmitted via the local 26, central or remote 10 rules engine and connection manager. For instance, buffered video data from dash cams 16 or rear view cams, amongst others, may be transmitted in real-time, while higher quality video may be recorded for later transmission along with buffered video data captured by the system, and may be marked with incident time stamps.

In another embodiment, certain events 32 or incidents 36 might instruct the system to record the events 32 associated with an incident 36 to another storage methodology. For example, a police officer's gun being pulled from its holster might be recorded to a blockchain or other secure or tamper-proof method of information storage, thus preserving the content without fear of tampering.

The required increase in communications performance can be designated for a route of a vehicle or a person stored in electronic memory, and the modifying of the data routing paths associated with other networked devices to prioritize communications between the target device and the communications station includes modifying the data routing paths corresponding to subsets of the other networked devices that are proximate to the vehicle or the person while the vehicle or the person is traversing the route.

The sensors can, for example, include at least one of a weapon securement device sensor or an emergency vehicle lighting activation sensor, and the target device includes at least one of a body camera, an identification friend or foe transponder, or a dashboard camera. Other example embodiments are possible, for example, where the system is being used in relation to a sports event, at concerts, military, search, or search and rescue operations, among others.

The sensors, in some embodiments, can be cameras, microphones, or other recording devices.

In another embodiment, the processing of information 34, such as the audio data of a witness or suspect, might cause a different language to be detected and a full translation be requested via the local 26, central, or remote 10 rules engine and connection manager. A computer or an appropriate human resource would be prompted to translate the data. In some examples, an artificial intelligence analysis engine 80 may be engaged to detect the foreign language and translate it in real time. The artificial intelligence analysis engine 80 is a trained neural network implemented on a computer and having the ability to progressively self-improve (i.e., "learn").

The data 30 being gathered by various resources, such as cameras or sensors, can be sent to one or more locations either directly, such as through WiFi or another point-to-point method, or indirectly through the cloud, where it may be processed before being broadcasted or otherwise transmitted to one or more endpoints, such as a command centre 14.

Figure 2:
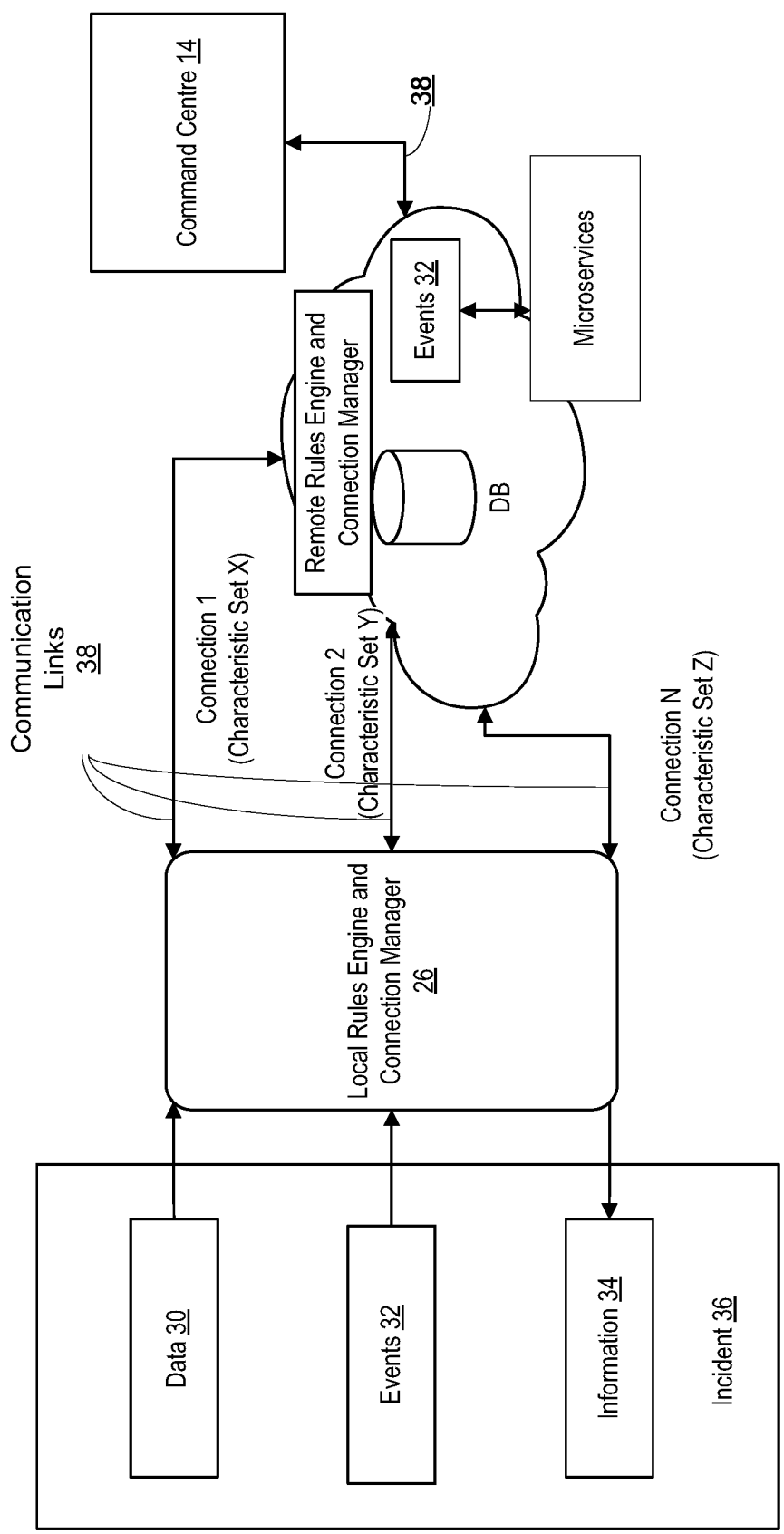
FIG. 2 is a block schematic diagram showcasing the process by which a remote rule engine and connection manager is configured to respond to data received from an incident, according to some embodiments.

FIG. 2 is a block schematic diagram showcasing the process by which a rules engine and connection manager may respond to data 30 received from an incident 36.

As events 32 occur and data 30 is generated at the location of an incident 36, decisions need to be made as to what and/or how information 34 on the data 30 and event 32 is to be sent to relevant endpoints, such as a command center 14, and the form that the information 34 would take, based on incident 36 priority and/or severity (e.g. a low frame rate, low resolution video might be preferred for low priority incidents, while a high resolution, full frame rate video stream, might be preferred for high priority incidents).

The central or remote connection manager 10 and rules engine may send information back to the local rules engine and connection manager 26, which may then send information back to the scene of the incident 36 for display and/or notification. The central or remote 10 connection manager and rules engine may at that time also communicate additional rules for the local connection manager 26 and rules engine, and vice versa.

A connection manager may select (or reconfigure) a communication link 38, or combination of links (or reconfigure bonding/aggregation of a combination of links), depending on the nature of the data 30 being transmitted or the availability of the communication links 38, to send information between the incident 36 and the command centre 14. In some embodiments, the connection manager selectively controls bonding/de-bonding of communication links 38, and may request additional resources by adding additional communication links 38 into a set of bonded communication links 38. Conversely, reduced resources may also be caused by removal of communication links 38 from a set of bonded communication links 38.

For example, the central rules engine, responsive to data sets indicative of additional officers approaching the scene, or additional incidents 36 taking place in the area of the incident 36, changes communication paths to account for additional communication traffic expected on communication links 38 in the area due to the devices that the system manages and other expected traffic which may be related to the incident, such as cell phone traffic at an accident scene or a demonstration. In an embodiment, changing of communications paths includes disrupting/lowering priority of other communications (e.g., non-police/emergency/fire communications) in area of incident (which may help disrupt communications, for a malicious actor, for instance), by signalling relevant network controllers. That is, beyond changing priorities for police related comms on what might be a private network, actively seek to effect comms not controlled by the system (e.g. onlookers clogging networks with their own live video from a scene at the expense of police video of same incident. In some cases the system would have to adapt to that reality (rely less on those networks, be more willing to use higher cost protected networks), but in others, may be able to instruct network provider to disable all communications but those that are part of the system).

A communication link 38 or combination of links may have a set of characteristics, such as low latency, high throughput, or high reliability. The set of characteristics may change in real-time. A local 26, central, or remote 10 communication manager and rule engine may assess the set of characteristics to identify a communication link 38 or combination of links that may be preferable as a medium over which to send data 30 to or from an incident 36, based on an assessment of the severity and/or priority of the incident 36.

In some embodiments, an artificial intelligence analysis engine 80 may be engaged to assess the set of characteristics to identify a communication link 38 or combination of links that may be preferable as a medium over which to send data 30 to or from an incident 36, based on an assessment of the severity and/or priority of the incident 36.

In one embodiment, local 26, central, or remote 10 communication manager and rule engine may assess local computing capacity, network connectivity, latency needs, and cost; determine whether work, such as video, image, or audio processing, should be done at an edge node or in the cloud; and allow for transfer of control back and forth as real-time conditions or computation demands change.

Both the remote and local rules engines may trigger changes in the behaviour of applications or devices, both at the scene of the incident 36 and elsewhere. For example, in addition to, or instead of, changing the connection or combination of connections to send dash cam video, the central rules engine may instruct the local rules engine to lower or raise the video resolution, data rate, latency, redundancy or scope of error correction at which the video is encoded prior to transmission.

The central connection manager and rules engine may collect and distribute content from one or more incidents 36 back to a remote command centre 14, and may receive instructions from that command centre 14 that impact its own rules and which may also be routed to local rules engines.

The central connection and rules engine may contain an event queue that may dictate that specific actions, such as the re-routing of communication networks, are needed based on an assessment of data 30 from an incident 36. The event queue is used to distribute events 32 and data 30 to other services in the cloud, namely microservices. The microservices process events 32 and data 30, possibly integrate data 30 from other sources, and possibly generate incidents 36 or additional events 32.

For example, the system may have an event 32 relating to the capture of a license plate, and this event 32 serves the license plate information to an external database, or databases, in search of matches.

In some embodiments, an artificial intelligence analysis engine 80 may be employed to assess and analyze data in an event queue based on pre-set rules or flexibly-determined rules that automatically adjust as the artificial intelligence analysis engine 80 progressively improves (i.e., "learns"). The artificial intelligence analysis engine 80 is a trained neural network implemented on a computer and having the ability to progressively self-improve. The artificial intelligence analysis engine 80 may analyze data 30 in the event queue and distribute events 32 and data 30 to other services in the cloud, namely microservices. The microservices process events 32 and data 30, possibly integrate data 30 from other sources, and possibly generate incidents 36 or additional events 32.

Figure 3:
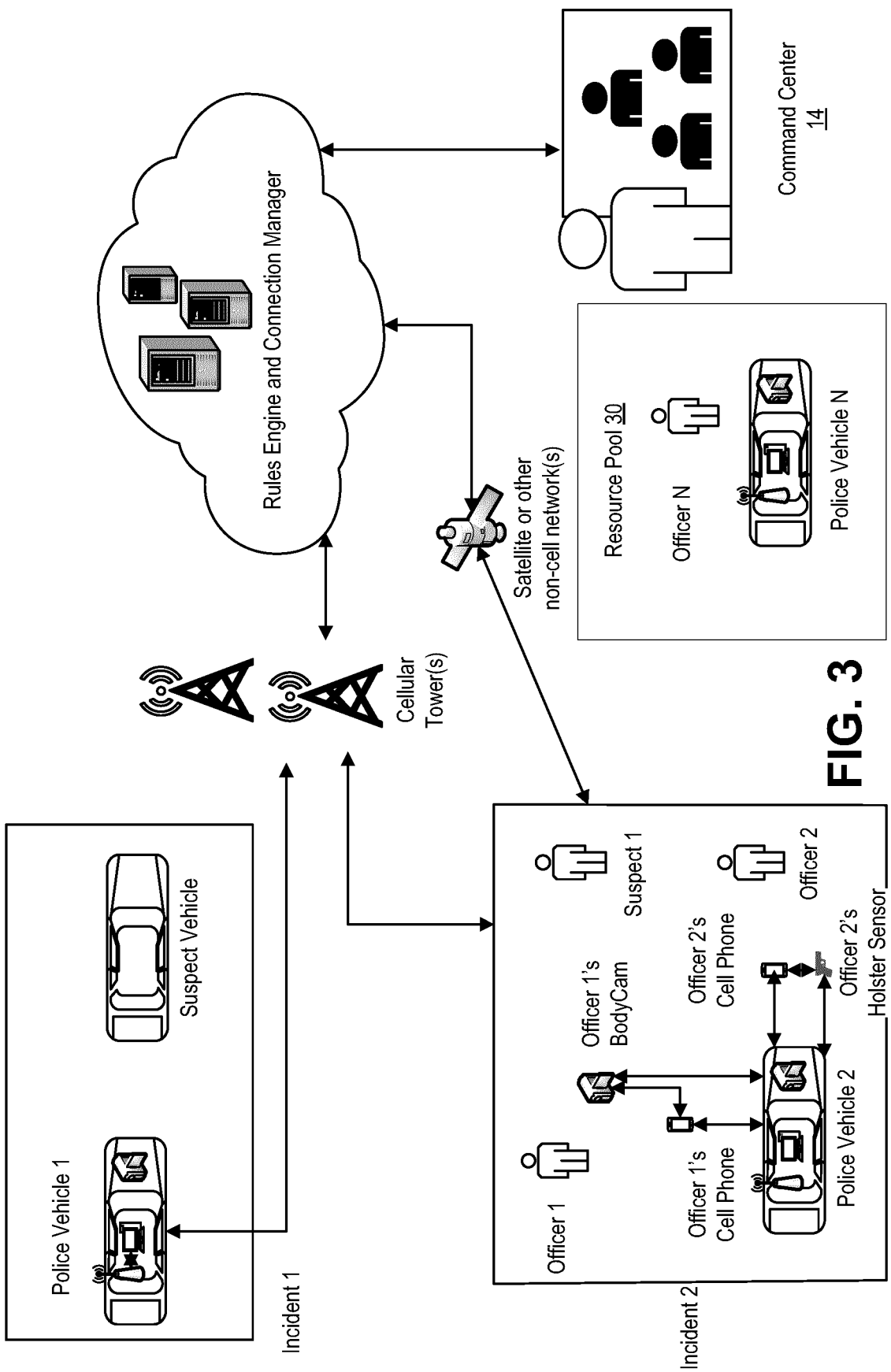
FIG. 3 is a block schematic diagram of an example scenario of the rules engine and connection manager configured to respond to multiple incidents that occurred near each other, impacting connection choices, according to some embodiments.

FIG. 3 is a block schematic diagram of an example scenario of a rules engine and connection manager responding to multiple incidents occurring near each other and impacting connection choices.

In one embodiment, knowledge of other events 32 and incidents 36 happening or likely to happen in an area may be used to determine the course of action. For example, where a robbery is developing, knowledge of that event 32 and other events 32 taking place nearby will inform which police vehicle to be sent as back-up based on a number of factors, including proximity to the location of the robbery and availability of the police car, among others.

In another embodiment, the knowledge of other events 32 and incidents 36 can assist in managing other police resources, including for example, the management of shared connectivity resources such as satellite or cellular connections, or shared computation or cloud resources, by, for instance, instructing police vehicles from the resource pool 30, which are not involved in the incident 36, to patrol unmanned routes. Unmanned routes can be identified (and possibly new routes determined), and could be based on the regular resources on those routes being involved in the active incident (e.g., a police officer with a required language skill is re-assigned to an emergency scene, leaving his/her original route unattended, and the system may dispatch a reserve officer to patrol the original route).

By having knowledge of the assets attached to a particular police officer 12, such as lethal weaponry available to the police officer 12, the system may recommend next steps in the police officer's 12 course of action. For example, the system may provide the police officer 12 with information regarding the availability of non-lethal alternatives, like tear gas or a bean-bag shotgun in nearby vehicles, along with the vehicle's location data 30. In some embodiments, an artificial intelligence analysis engine 80 may be used to analyze and compare events to standard workflows or similar past events to extract statistics and insights that can drive workflow improvements and opportunities for training improvements for staff in the field. The artificial intelligence analysis engine 80 is a trained neural network implemented on a computer and having the ability to progressively self-improve (i.e., "learn").

Figure 4:
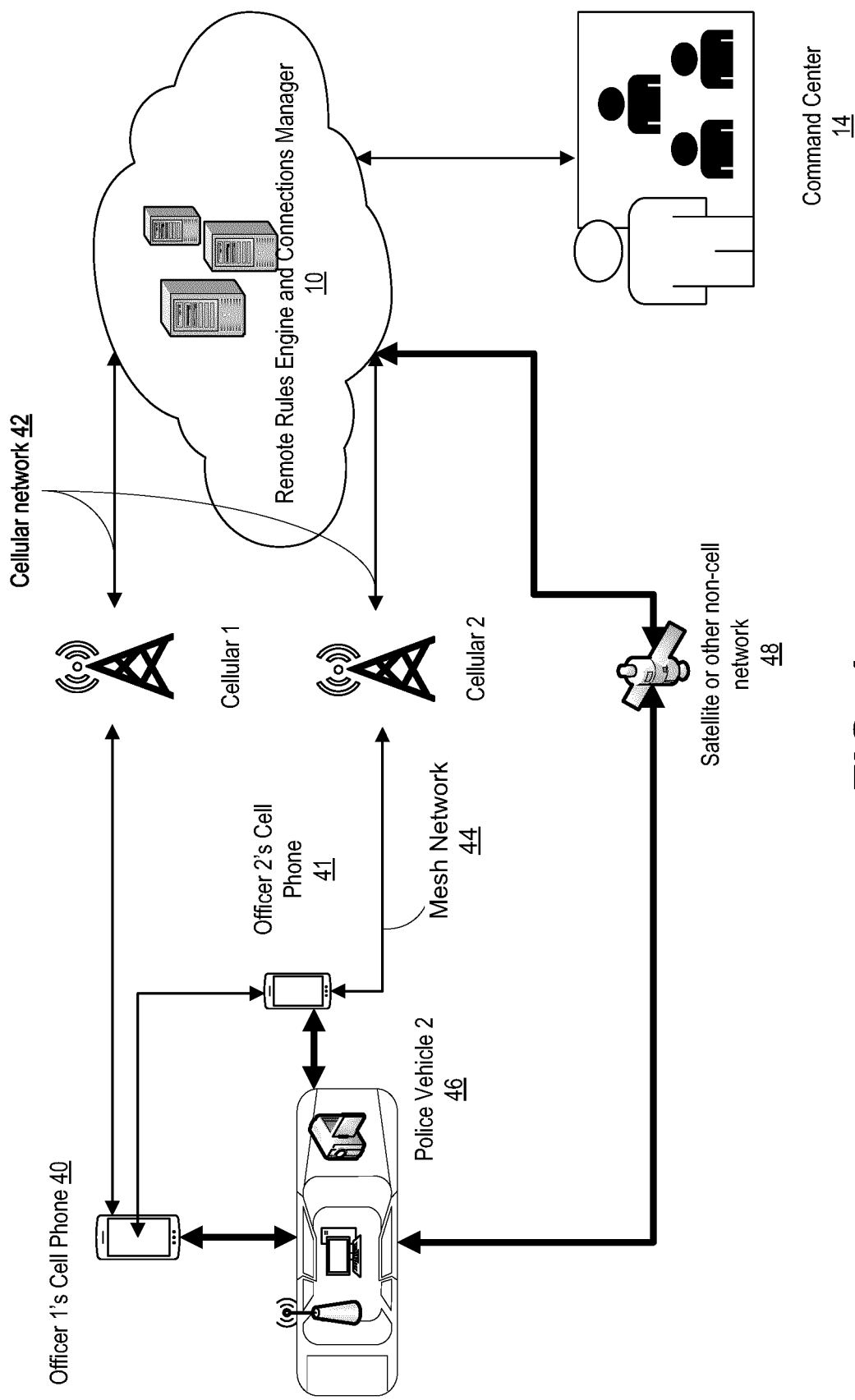
FIG. 4 is a block schematic diagram showing that, in some instances, the remote rules engine and connection manager may have the option to communicate data either directly or through a mesh network, according to some embodiments.

FIG. 4 is a block schematic diagram showing that, in some instances, the remote 10 rules engine and connection manager may have the option to communicate data 30 either directly, through a cellular network 42 or indirectly, through a mesh network 44 formed through intelligent bonding/aggregation of communication links 38.

In some embodiments, a bonded communication link may be contained within a single device, for example a bonded internet gateway in the car for purposes of data transmission, and in other embodiments, an ad hoc mesh network 44 might be used to transmit the data.

In some embodiments, a mesh network 44 could be a local network created by connecting several devices, whereby one or more of those devices transmits its own data as well as serving as a relay for the other device(s). For example, a police officer's cell phone that is out of signal range may be connected to a second police officer's cell phone and to that officer's police car's internet services to create a mesh network 44 for data 30 transmission and receipt. The officer's phone may be out of cell coverage, but may connect to the second phone through an alternate mechanism (e.g., WiFi or Bluetooth).

FIG. 4 shows that an application on a first officer's cell phone 40 or embedded in the officer's body cam 18, could be used to send video data 30 to the remote 10 rules engine and connections manager directly via a cellular network 42, or in conjunction with a mesh network 44 created with a second officer's cell phone 41 via a local WiFi network. In this example, the system may be instructed based on an analysis of the priority and/or severity of an incident to send the video data 30 via the communication links 38 in a police vehicle through, for example, a satellite connection at the stationary vehicle 48.

Figure 5:
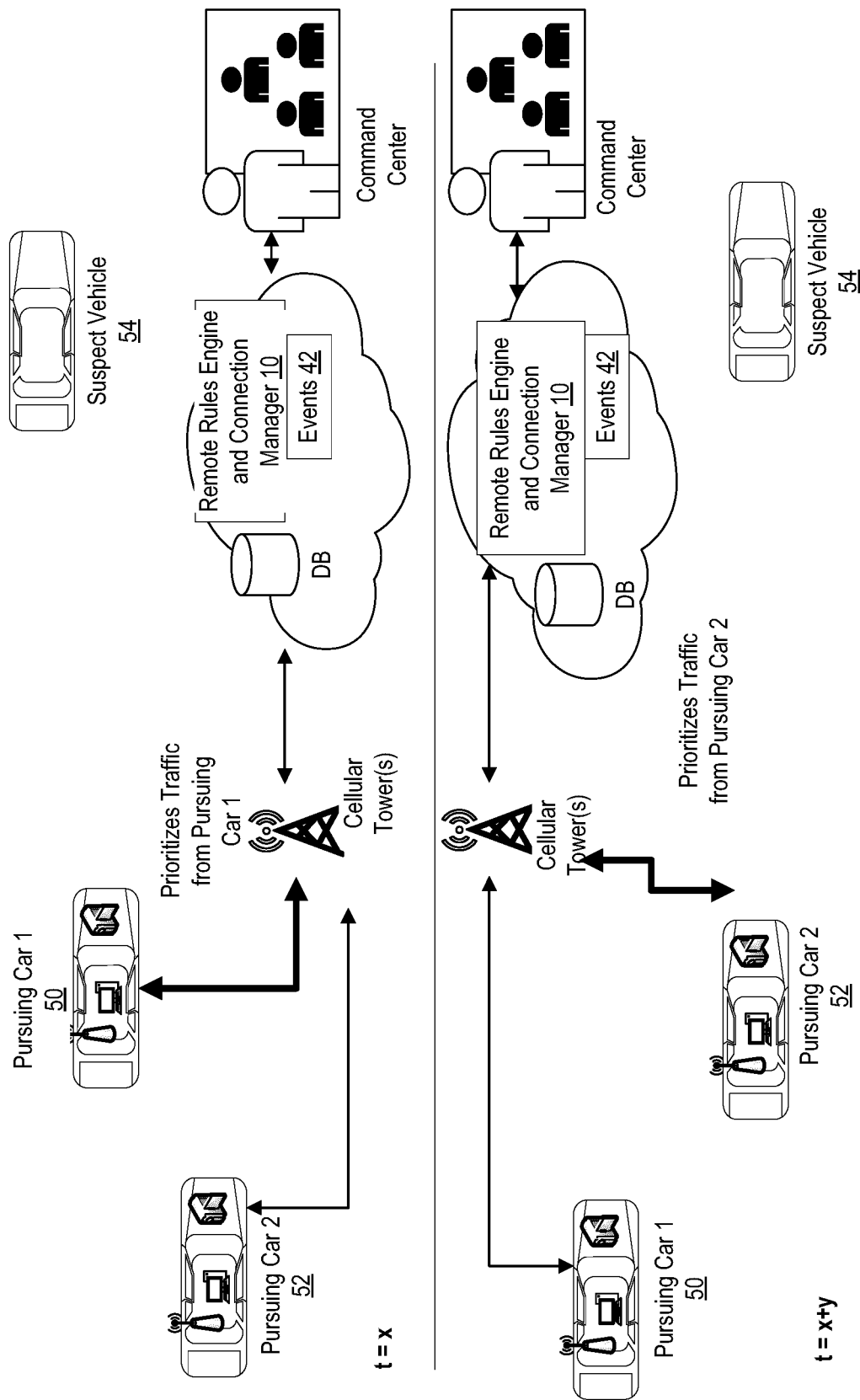
FIG. 5 is a block schematic diagram showing that, in some instances, the central connection manager, command centre, or the local rules engines are configured to modify how data is prioritized, according to some embodiments.

FIG. 5 is a block schematic diagram showing that, in some instances, the central connection manager, command centre 14, or the local rules engines, may decide to change which data 30 to prioritized based on information 34 regarding the incident 36.

For example, in the case of a car chase, at time x, it may be appropriate to send dash cam 16 video from a first pursuing car 50, and at time x+y, it may be appropriate to send video from a second pursuing car 52, to maximize chances that the suspect vehicle 54 remains in focus. The appropriateness of the data 30 to be prioritized in each situation may relate to the nature of the content of that data 30, for instance the second car 52 being closer to the incident 36 at time x+y, or could relate to other factors, such as the quality of the communication link 38 between the vehicles and the network, including the potential for poor signal coverage.

The rules engines may also instruct some vehicles or other resources not to send video or other data 30, or to send it at a lower resolution, different latency, or lesser cost, if it would be redundant, or if communication resources are in short supply and priority is desired for the preferred resource. The service on the lower priority feed may, for example, lower resolution, frame rate, etc., or modify allocation mechanisms to be less aggressive in grabbing bandwidth (e.g., allowing the local app to determine how to deal with it (via dropping resolution etc.)).

Figure 6:
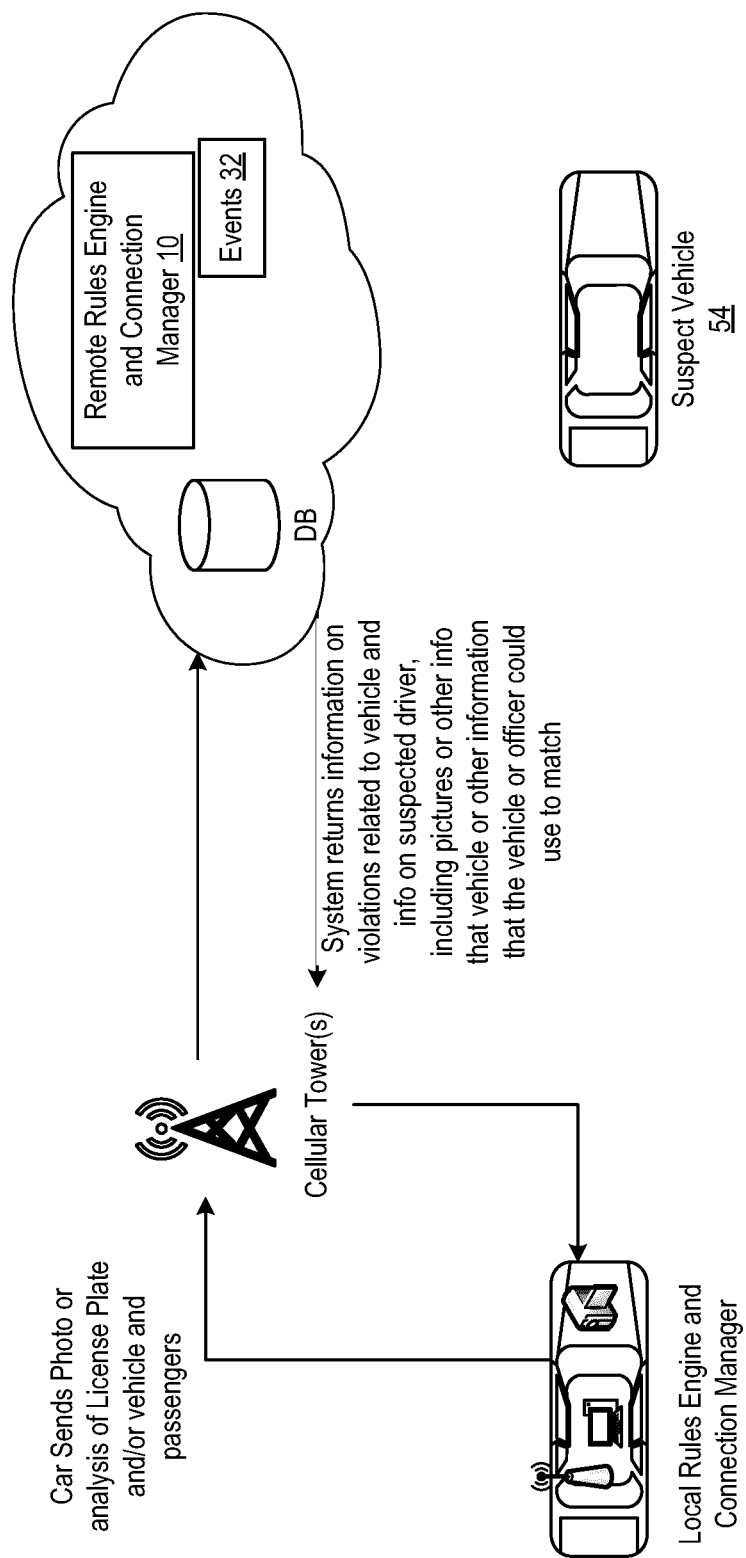
FIG. 6 is a block schematic diagram of an example scenario of the central engine and connection manager configured to respond to information received from a police vehicle, according to some embodiments.

FIG. 6 is a block schematic diagram of an example scenario of the central rules engine and connection manager responding to information received from a police vehicle.

In this example, a police vehicle, in which a local rules engine and connection manager 26 is located, sends a specific bit of information 34 from the local scene to the central rules engine. The rules engine and connection manager may be one entity or separate entities in separate virtual or physical locations.

The information 34 transmitted from the local scene could be a picture of the suspect vehicle 54 and the license plate for processing at a central location, or the actual license plate number as determined by image processing conducted at the vehicle. The central rules engine then processes the information 34 and sends an output that provides guidance or specific information to the officer (i.e., "actionable intelligence), such as whether the car is stolen, whether the driver has a warrant, or a picture of the suspected driver.

Figure 7A:
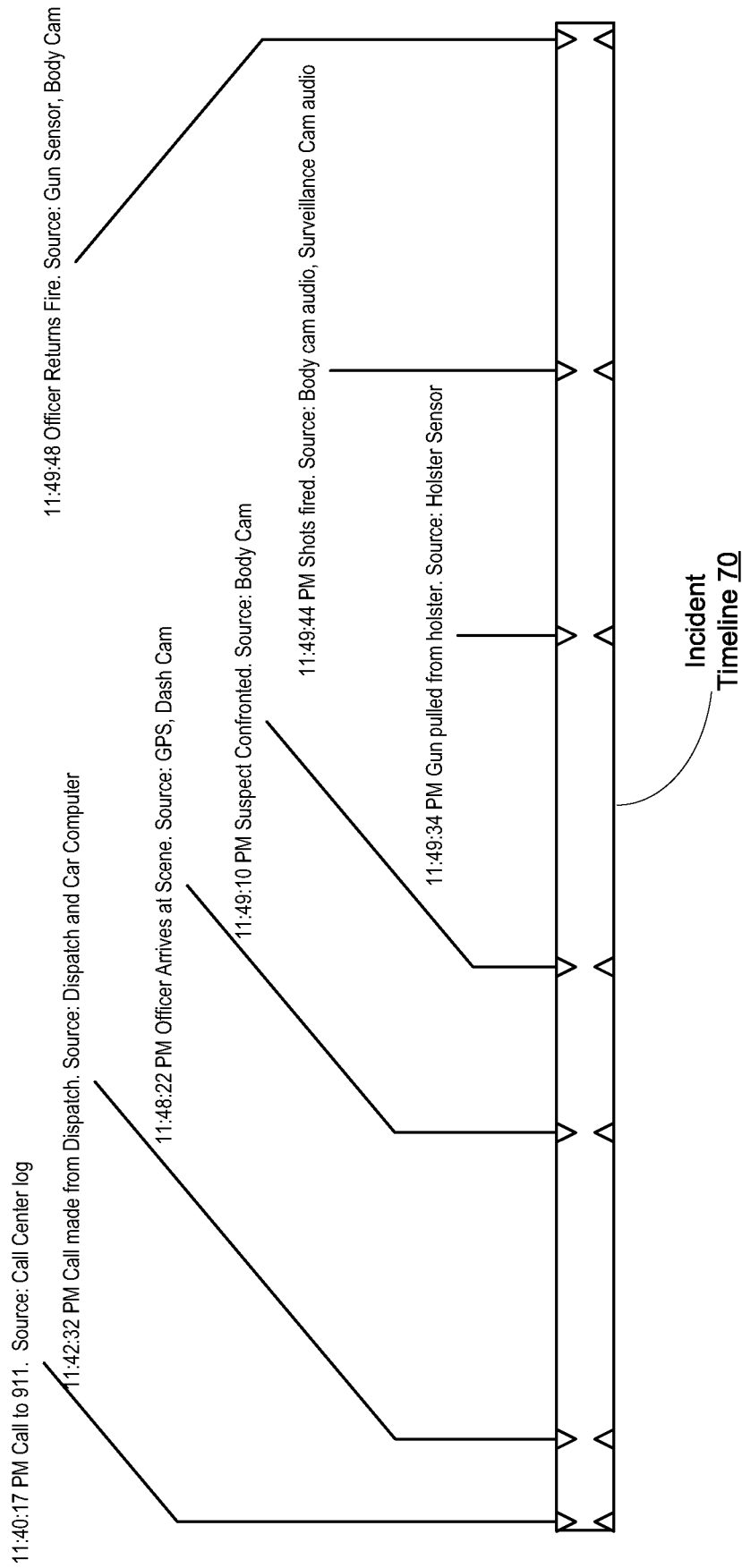
FIG. 7A is an example of a type of graphical timeline (or other type of timestamped recording or data structure) that may be constructed based on data collected and transmitted from an incident, according to some embodiments.

FIG. 7A is an example of a type of timeline 70 that may be constructed based on data 30 collected and transmitted from an incident 36.

With data 30 related to a given incident 36 being collected and transmitted from a variety of sources, a timeline 70 may be constructed to provide a detailed outline of the incident 36. The determination of what events 32 are related to the incident 36 may be made manually, or automatically based on a set of rules, or by employing an artificial intelligence analysis engine 80.

In one aspect, an artificial intelligence analysis engine 80 capable of conducting facial recognition, audio/semantic analysis, and intelligent searches, may be engaged to conduct an analysis on the incident timeline 70 to determine if gaps in the incident timeline 70, or in views of a particular moment in time, could be identified. Based on the analysis, data 30 collected and transmitted from different sources of an incident 36 may be fused to complete gaps identified by the artificial intelligence analysis engine 80 with existing information, information which should be sought by other investigative means, or information from events that may have occurred prior to the start of the incident.

In some examples, an artificial intelligence analysis engine 80 may be employed to determine if gaps in the timeline 70 or in views of a particular moment in time, could be identified and filled either with existing information, such as a dash cam 16 video from a nearby officer's vehicle, or by information sought by other investigative means, such as identifying locations near a shooting incident 36, which may provide either witnesses or security camera footage providing a different vantage point of the incident 36. For example, one of the things the system might auto-detect are other security cameras in the video feed of the initial camera (to help quickly identify relevant cameras more quickly than by canvassing the area and hoping that officers will observe the cameras attached to local shops etc.).

The artificial intelligence analysis engine 80 is a trained neural network implemented on a computer and having the ability to progressively self-improve (i.e., "learn").

An incident timeline 70 may be produced both in real-time and after the fact. In real-time, the timeline 70 may predict future events based on information currently in the timeline 70, including for instance various location information 34 provided during a car chase, such as the direction of travel, GPS location, or speed, and information on a suspect generated by license plate recognition. The system might predict locations where the suspect is likely heading, which could allow the police to predict the route of the chase, or get officers to the likely endpoint of the chase, and allow the chase to end prematurely, protecting public safety along the chase route.

In generating an incident timeline 70, time syncing between the various devices and data sources will need to be considered both during and after the incident, as computing duties may be passed back and forth between different devices. For instance, during a chase, certain image processing may be done in the cloud, but would need to move back to the vehicle if connectivity was dropped.

In one embodiment, accurate time syncing of all elements, including transmitters and sensors, related to a given incident are generated using precision time protocol or a central/cloud time sync for recorded content.

Incident timelines 70 can be edited or annotated, with such edits or annotations being tracked.

Figure 7B:
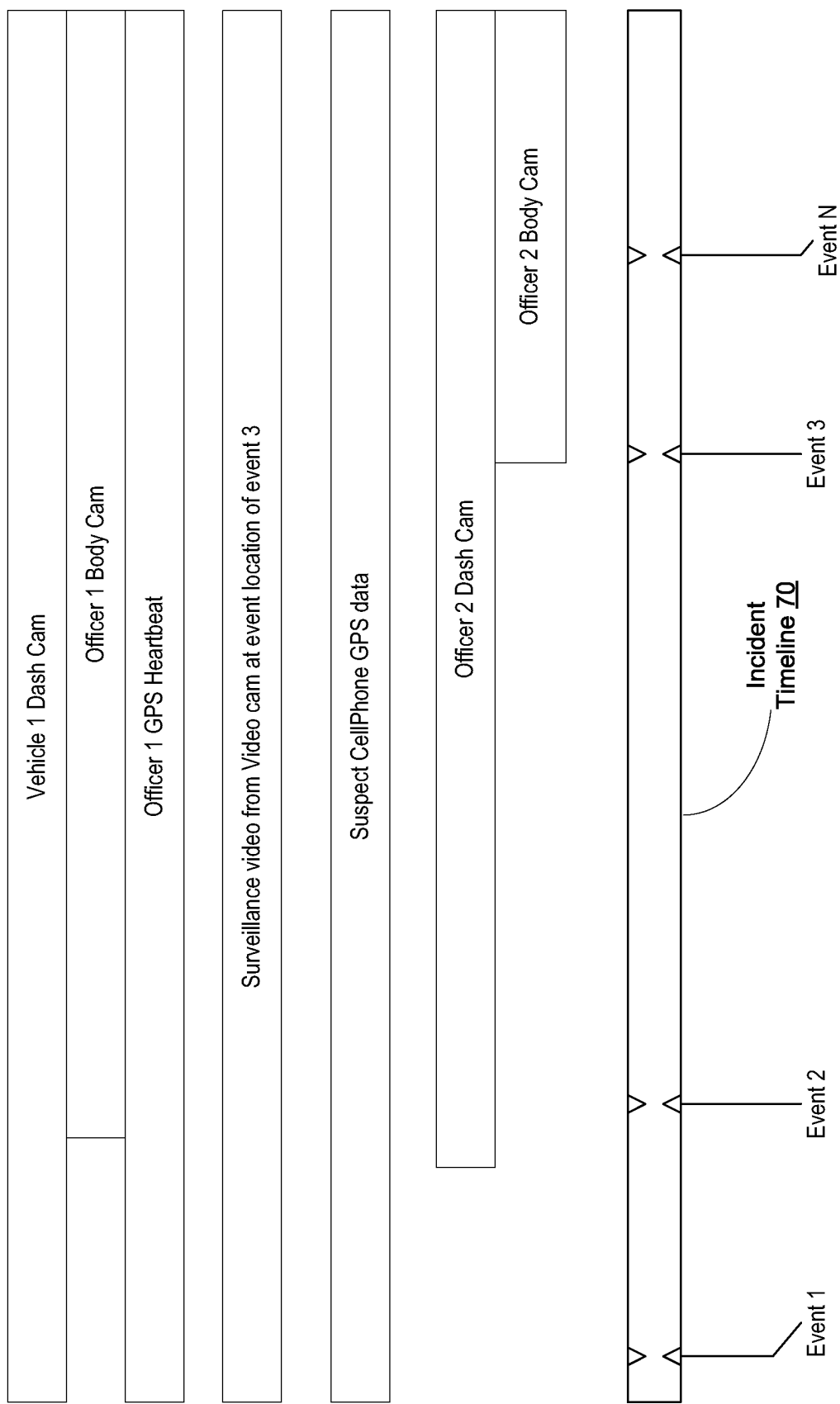
FIG. 7B is an example of a type of graphical timeline (or other type of timestamped recording or data structure) constructed based on data collected and transmitted from an incident, wherein the events constituting the timeline are mapped back to raw audio/visual/contextual source material to provide a comprehensive view and understanding of the incident, according to some embodiments.

Like in FIG. 7A above, FIG. 7B is an example of a type of timeline 70 that may be constructed based on data 30 collected and transmitted from an incident 36.

FIG. 7B presents an embodiment where events constituting the timeline 70 are mapped back to raw audio/visual/contextual source material to provide a comprehensive view and understanding of the incident. An artificial intelligence analysis engine 80, capable of conducting facial recognition analysis, audio/semantic analysis, and intelligent searches, may be engaged to create the incident timeline 70 by fusing data collected and transmitted from different sources of an incident 36. The artificial intelligence analysis engine 80 is a trained neural network implemented on a computer and having the ability to progressively self-improve (i.e., "learn"). The fusion of data 30 may be completed in real-time or after the fact. The incident timeline 70 may be edited or annotated, with such edits or annotations being tracked.

Figure 8:
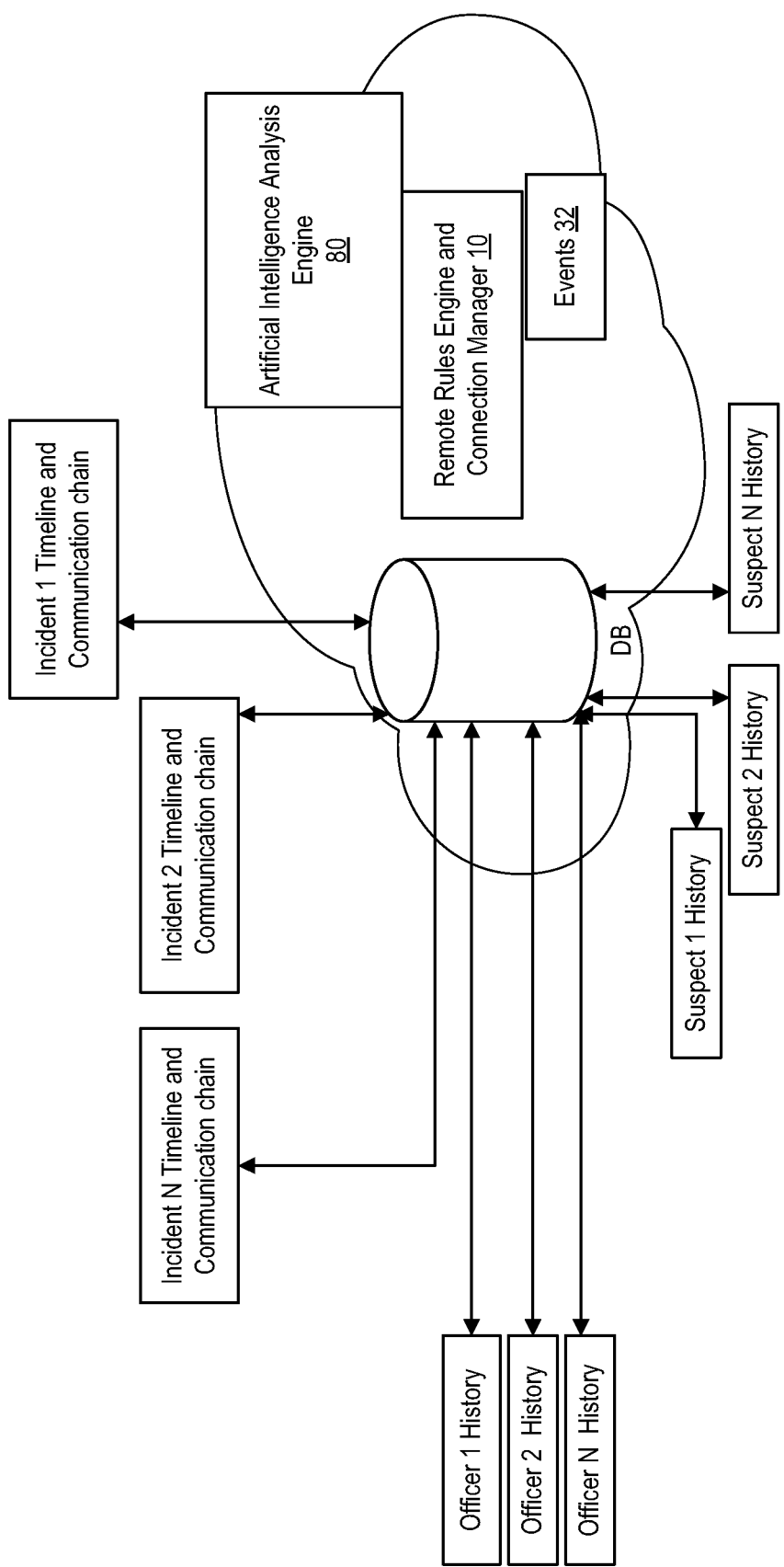
FIG. 8 is a block schematic diagram showing the process by which an artificial intelligence analysis engine analyzes events in real time or post hoc and predicts how the events might play out in real time using data from an incident, according to some embodiments.

FIG. 8 is a block schematic diagram showing the process by which the artificial intelligence analysis engine 80 may predict how events 32 might play out in real time, using data 30 from an incident 36.

In one embodiment, the artificial intelligence analysis engine 80 may be used to analyze and compare events 32 to standard workflows or similar past events 32 to extract statistics and insights that can inform a prediction on how events 32 might play out in real time. The artificial intelligence analysis engine 80 is a trained neural network implemented on a computer and having the ability to progressively self-improve (i.e., "learn").

In one embodiment, an analysis conducted by the artificial intelligence analysis engine 80 may suggest possible relevant resources of information 34 from events 32 that may have occurred prior to the official start of an incident 36. For example, while a 911 call triggers the incident 36 from a police action perspective, the criminal incident 36 would have begun earlier, and the system may be able to suggest other resources to help in any follow-up investigation of the underlying criminal action, such as tracing back from the time the dash cam 16 picked up the vehicle it is chasing, determining what other cameras might have seen the vehicle prior to the chase beginning, based on knowledge of the location of other vehicles, and predicting a likely path of the suspect's vehicle.

In another embodiment, the artificial intelligence analysis engine 80 engages in "time-shifting", whereby the system is instructed to request a camera that records in a loop to rewind and record from the beginning of the loop, for example, qucapturing video recorded before the official start of the incident and preserves it, in case in may be relevant to the incident. The embodiment provides the ability for data 30 relevant to an incident, such as video camera footage relating to an event 32 occurring prior to the official start of the incident 36, to be made accessible post hoc through real-time decisions by the artificial intelligence analysis engine 80. The artificial intelligence analysis engine 80 is a trained neural network implemented on a computer and having the ability to progressively self-improve (i.e., "learn").

Focusing in on the artificial intelligence analysis engine 80, as numerous data 30 points are collected on incidents 36, officers, suspects and other elements, it may be possible to predict how events 32 might play out in real-time or mine the data 30 to offer recommendations for improvements to officer training, routes for patrols, scheduling of officers, amongst others. The artificial intelligence analysis engine 80 may also be used to analyze and compare events to standard workflows or similar past events to extract statistics and insights that can drive workflow improvements and opportunities for training improvements for staff in the field.

In a real-time example, it may be known that one officer is quick to remove a weapon from its holster, potentially escalating a conflict. Knowing that the officer is approaching a scene where the suspect's precarious mental state is also known, and providing that information 34 to the officer, might reduce the likelihood of the officer shooting the suspect during their interaction and opting instead to employ other approaches to which the suspect may be more responsive. In one embodiment, an artificial intelligence analysis engine 80 may be used to analyze and compare events to standard workflows or similar past events to extract statistics and insights that can inform a prediction on how events might play out in real time. The artificial intelligence analysis engine 80 may be engaged to perform sentiment analysis or vocal stress analysis, or conduct and analyze the suspect's historical data. The artificial intelligence analysis engine 80 is a trained neural network implemented on a computer and having the ability to progressively self-improve.

In another embodiment, the system may recommend and/or requisition a particular resource, such as a SWAT team or a trained negotiator, to assist in a particular situation, based on a prediction of how the various events 32 currently in an incident timeline 70 might play out. An artificial intelligence analysis engine 80 may be engaged to provide officers involved in the incident 36 with guidance informed based on data 30, such as sentiment analysis or vocal stress analysis, or a search of the suspect's historical data, that could assist the officer to negotiate or de-escalate the incident.

In still another embodiment, the system may determine that gaps tend to exist in incident timelines 70 involving data 30 from particular locations, and recommend changes to communication networks available to police officers 12, such as ensuring that vehicles travelling through the location carry cell phones from a particular carrier, or have access to satellite networks in addition to a cellular network, or identify locations suitable for additional fixed surveillance cameras that the officers could rely on.

In yet another embodiment, based on an officer's history and/or location of next deployment, the system might recommend training to better prepare the officer for scenarios that he or she might face. For example, an officer who will be deployed for the first time on a route in an area known for heavy drug use, may be assigned training, or have information pushed to them in real-time, indicating methods of detecting the types of behaviour that they might encounter in people under the influence of a particular drug. An artificial intelligence analysis engine 80 may also be used to analyze and compare events to standard workflows or similar past events to extract statistics and insights that can drive workflow improvements and opportunities for training improvements for staff in the field. The artificial intelligence analysis engine 80 is a trained neural network implemented on a computer and having the ability to progressively self-improve.

In another example, an artificial intelligence analysis engine 80 may be used to analyze and compare events to standard workflows or similar past events, such as a report of stolen goods, and an inventory of goods recovered at an incident 36, to extract statistics and insights regarding potential trends in theft incidents that can drive workflow improvements and opportunities for training improvements for staff in the field.

Figure 9:
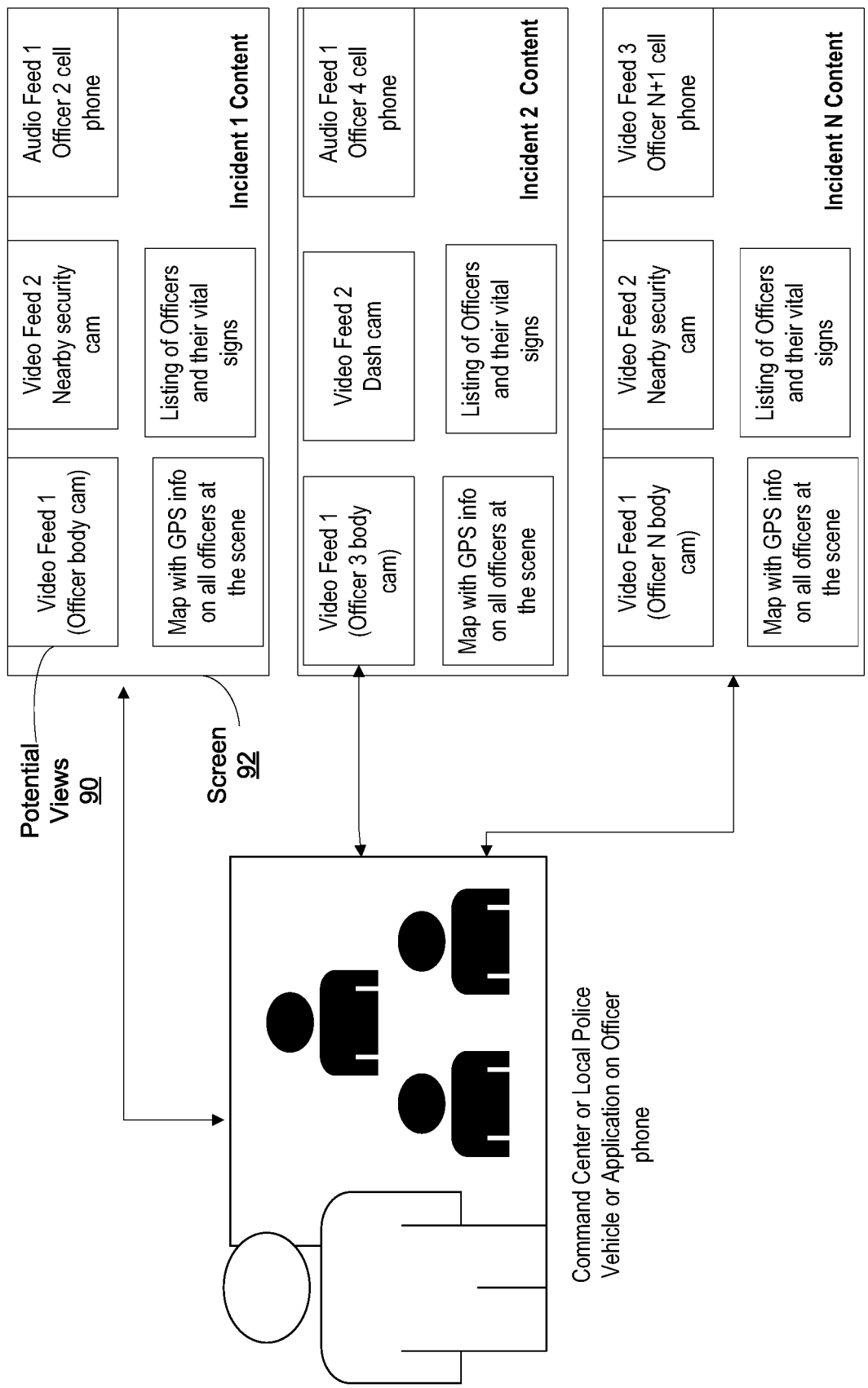
FIG. 9 is an example view of some of the data sources that might be available for viewing at a command centre, according to some embodiments.

FIG. 9 offers a comprehensive view of some of the data 30 sources that might be available for viewing at a command centre 14.

One or more of the views 90 depicted in FIG. 9 may be available at various endpoints, such as a command centre 14. For instance, an officer may have a view 90 of an incident available to the officer on the monitor of the officer's squad car, or on the officer's cellphone.

The content of each incident view 90, or the priority given to each view 90 may be determined manually or by a set of rules in real-time. For instance, a gun being pulled from a holster may immediately be prioritized and multiple views 90 provided to the command centre 14, placing the incident 36 view in a prominent location on the screen 92.

One view 90 of an incident 36 may, but does not need to, contain a specific set of data 30 sources, or similar sources in a different form, as other views of the incident 36 displayed elsewhere.

For example, it may be possible for a local police officer 12 to have raw video from the immediate scene, whereas the command centre 14 may only have a severely compressed video available for viewing due to network constraints requiring a lower bit rate being transferred. On the other hand, it may also be the case that a low resolution video is provided to the police officer 12, since the screen they are observing is small and a higher resolution would not be required.

Restrictions on who may see a particular data 30 point or receive certain output that provides guidance or specific information to the officer (i.e., "actionable intelligence), may be based on rules. For instance, it may be the case that a police dispatcher is prevented from seeing certain data 30 so that they are not brought into a case as a witness.

Any number of other views is possible for any number of data 30 sources and any number of locations.

Figure 10:
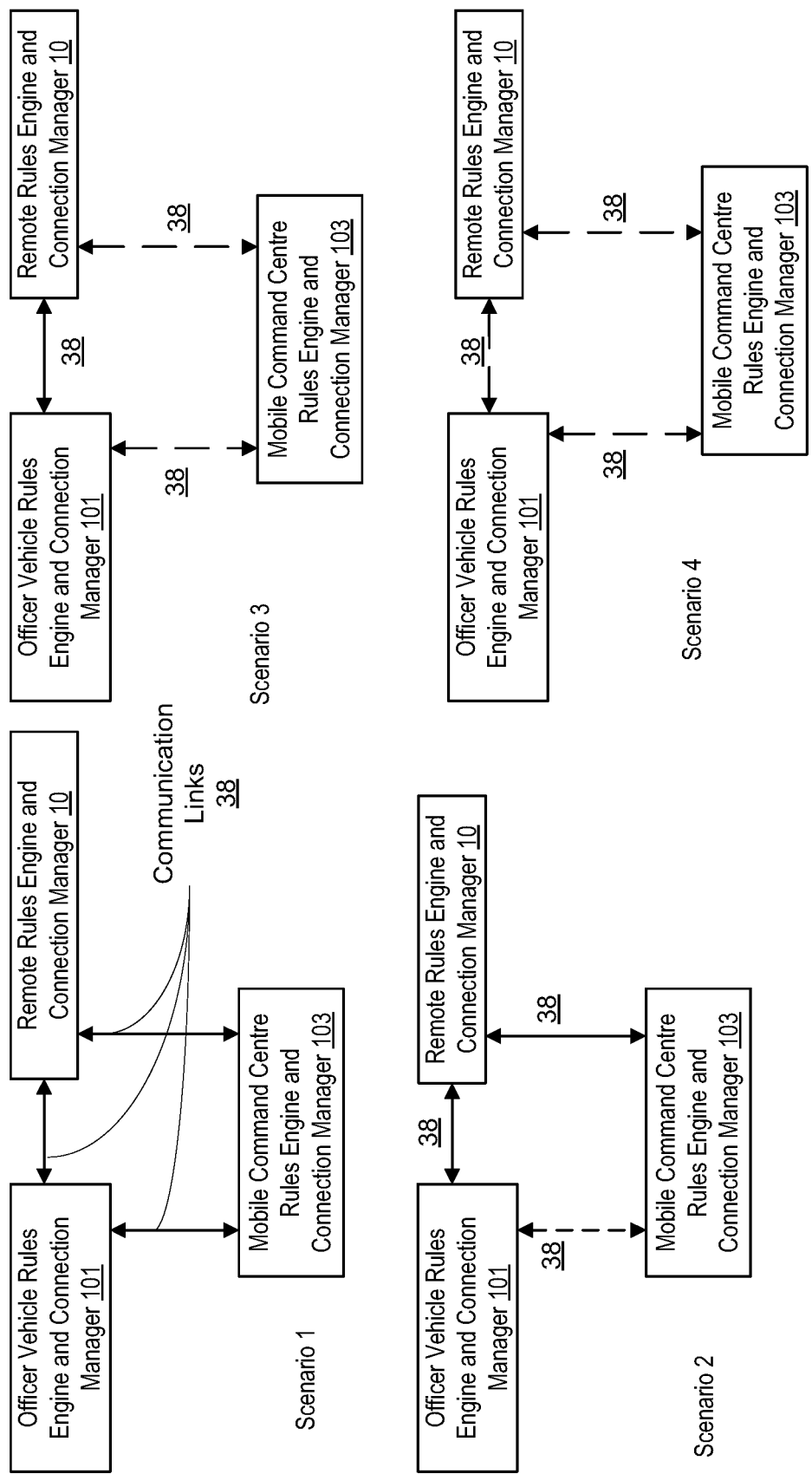
FIG. 10 is a block schematic diagram showing four communications scenarios in which various techniques are implemented to manage the breakdown of the asserted rule hierarchy.

FIG. 10 is a block schematic diagram showing four communications scenarios in which various techniques are implemented to manage the breakdown of the asserted rule hierarchy.

For example, purposes only, each scenario illustrated in FIG. 10 comprises of three rules engines and connection managers, namely: the officer vehicle rules engine and connection manger 101, the remote rules engine and connection manager 10, and the mobile command centre rules engine and connection manager 103. More or fewer than three rules engines and connection managers may be employed in any one incident 36.

The three rules engines and connection managers in FIG. 10 operate under a set of hierarchy rules (e.g. rules stating that mobile commands trump all other commands), which may be determined by a number of factors. For example, where the location of the rules engines and connection managers relative to the incident 36 is too great, the remote rules engine and connection manager 10 may not be available to the extent required by the incident 36, and thus the mobile command centre rules engines and connection managers 101 may take over to provide the required coverage of the incident 36.

In another example, the severity of the incident 36 may dictate which rules engines and connection managers will provide coverage of the incident 36. For instance, for linked incidents 36 with national implications, the hierarchy of rules may be dictated by the remote rules engine and connection manager 10.

In another embodiment, different hierarchies may exist for different types of rules. For example, where a vehicle is equipped with a local rules engine and connection manager 26, a remote cloud rules engine and connection manager may dictate the video quality sent from the vehicle to the cloud.

The scenarios in FIG. 10 represent a situation at the time of the incident 36, or at any time during the incident 36. As circumstances change, an incident 36 may involve multiple scenarios, leading to shifts between multiple hierarchies and rules sets.

FIG. 10 illustrates four scenarios in which the mobile command centre rules engine and connection manager 103 is at the top of the hierarchy. In Scenario 1, all communications link 38 from all three of the rules engines and connection managers are available to receive and transmit data to and/or from an incident 36, and any preset hierarchy or rules is applicable (e.g. a rule stating that mobile command can send commands anywhere).

In Scenario 2, the officer vehicle rules engine and connection manager 101 is cut off from direct connection to the local command centre. The officer vehicle rules engine and connection manager 101 could inform the remote rules engine and connection manager 10 of this disconnection, and the remote rules engine and connection manager 10 could further inform the mobile command centre rules engine and connection manager 103, relaying commands through the remote rules engine and connection manager 10. In another embodiment, this communication break could also be detected by the mobile command centre rules engine and connection manager 103, which could trigger the re-routing of communications links 38.

In Scenario 3, two communications link 38 are down and the only connection available is that between the officer vehicle rules engine and connection manager 101 and the remote rules engine and connection manager 10. At this point, one or both of the systems may need to determine which rule set will dominate. Options may include: the remote rules engine and connection manager 10 taking over the communications links 38, splitting up the rules hierarchy between the two systems, or having each system operate independently of the other. The systems could also sync the "last known rule" received from the mobile command centre rules engine and connection manager 103.

In Scenario 4, all communication links 38 are down, and each rules engine must determine how to proceed. In some embodiments, the officer vehicle rules engine and connection manager 101 may operate on the "last known rule" (i.e. the last rule sent from one rules engine to another) sent from the top rules engine in the hierarchy. In other embodiments, the officer vehicle rules engine and connection manager 101 may immediately assert control and behave according to its own decisions. In yet another embodiment, the officer vehicle rules engine and connection manager 101 could combine the "last known rule" with local rules. In yet others, there could be a "time fade", whereby each rules engine blends decisions of the top hierarchy engine with its own, with the weight given to the last known rule from the hierarchy declining over time.

Different rules may require different methods of dealing with the loss of connection to the dominant rules engine. For instance, a "time fade", as described above, may be beneficial for video encoding decisions, while the remote triggering of a siren may require an immediate shift in control. When or if connections return, a similar process of discovery and conflict resolution will be required.

In another embodiment, the hierarchy of rules may be a hierarchy of caches for data 30 and events 32. For example, an officer's vehicle may act as a cache for locally connected sensors and sensors connected to officers associated with the vehicle. Command vehicles may act as caches for all of the nearby officer vehicles. The caches will retain data 30 for all incidents in progress so that it can be viewed by local officers and commanders in the event that the connection to the "upstream" engine is lost.

The rules engines may pass all of the data 30 upstream if sufficient bandwidth is available. If bandwidth is limited, the rules engines may prioritize the data 30 that is sent upstream by, for instance, only sending high-priority date and sending the lower priority data 30 at a later time. Rules engines may also synchronize instances of the microservices from upstream rules engines and execute the instances if the upstream connection is lost.

Figure 11:
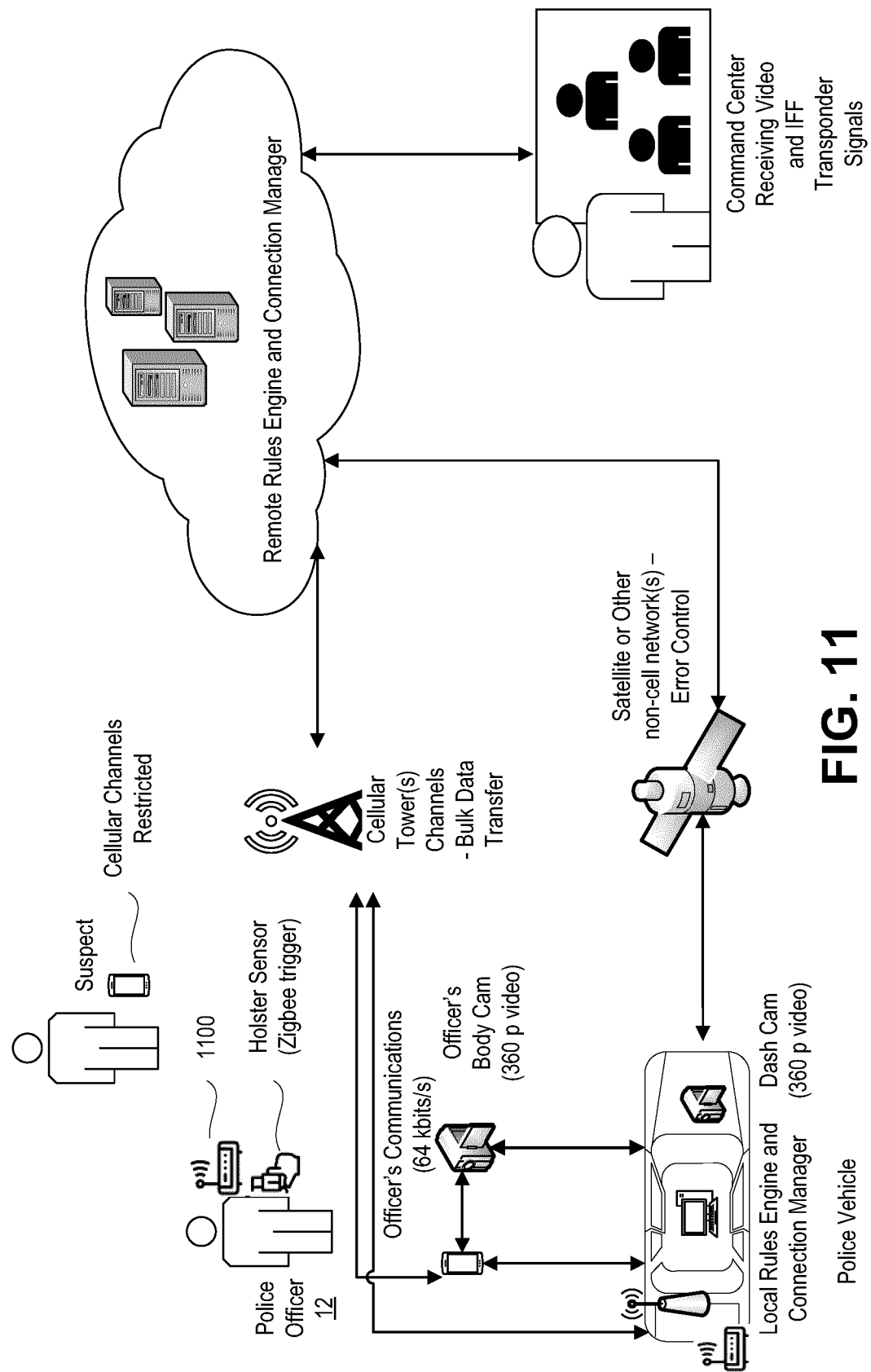
FIG. 11 is an example illustration of a scenario for dynamically modifying multi-path routing communication pathways responsive to a triggering event, according to some embodiments.

FIG. 11 is an example illustration of a scenario for dynamically modifying multi-path routing communication pathways responsive to a triggering event, according to some embodiments.

As shown in FIG. 11, a police officer is in pursuit of a suspect and draws a non-lethal weapon out of a holster. The holster includes a sensor 1102 which upon opening/closing of a fastener (e.g., button or hinge), transmits a signal to a communications coordination system 1100. In this example, the communications coordination system 1100 may be a portable networked communications controller that serves as a personal communications bus/communications manager for the police officer, which, for example, could be an application that is operated on a portable device, such as a smartphone.

The communications coordination system 1100 can include one or more network interfaces that provide communications both at a local level (e.g., via Bluetooth, Zigbee™ radio frequency), and with more remote devices (e.g., base stations through cellular connections, satellite connections, or microwave connections). The triggering event can also include passively or actively detected movements in sensors, such as detected movement frames of a body camera or a dashboard camera, or other sensed activities. For example, the police officer's body camera may include software adapted for identifying objects that appear to be weapons in frames, and upon detection of such an object, may automatically send a signal to the communications coordination system 1100 to request enhanced communications. Similarly, the dashboard camera can also track visual elements, such as a license plate of a stolen car, and also send a signal to the communications coordination system 1100 to request enhanced communications.

The communications coordination system 1100 acts to control multi-path routing for controlling network pathways that are utilized for communication between the police officer's devices and one or more base stations such that the police officer's devices are able to connect in real or near-real time (as opposed to relying solely on local storage). There may be multiple network links, and some of them may be indirect (e.g., routing through another, stronger networked connection coupled with the police officer's squad vehicle, or direct (e.g., through cellular or satellite connections thereof).

However, the scenarios in which the system 1100 is utilized present challenging spectral environments, and network congestion and latency impact the ability to transmit information back to the base station. For example, the communications coordination system 1100 may be recording live video feed from a body camera, transmitting weapons holster status, transmitting information in accordance with a friend or foe identification system (e.g., a personal transponder that acts as a beacon providing GPS location and identification as a police officer), among others. Transmitting this information requires significant bandwidth resources, which may not be readily available through the network connections without adaptive routing.

In this example, the communications coordination system 1100 is configured to dynamically modifying the multi-path routing of the communication pathways responsive to the event (e.g., holster unbuckled). Upon a sensor signal being received by the communications coordination system 1100, networked communications are triggered to start prioritizing pathways to the communications coordination system 1100 and to de-prioritize other nearby communications.

A required change in communications performance is identified (e.g., body camera needs to transmit at least 360p video or still image frames every second, police terminal needs to obtain an immediate warrant by transmitting a request file that is 2 MB, mobile device needs to clear at least a channel having a bitrate of 64 kbits/s for a DECT signal). The total change required is an increase of 2 Mbps, for example. The overall required performance may depend on the device or sensor requesting enhanced performance—for example, a body camera may require less bandwidth than a prioritized dashboard camera, or vice versa.

After the event is de-escalated, for example, after apprehension of the suspect, the police officer returns the device to a holster and provides a signal to the system 1100 that the event is over. Upon the receiving of a triggering event indicative of de-escalation, network communications are de-prioritized and the system 1100 coordinates the modification of the data routing paths to return to a pre-escalation connection arrangement.

Controllability may be an important factor in situations (e.g., military) where not only may the system 1100 not have full control over other networks, but it also is adapted to avoid certain types of communications on certain networks, or reduce its aggressiveness in requesting bandwidth, as it may tip off whoever is monitoring the network that something significant is happening, or about to be happening, in an area that might be quickly determined by triangulating on the various networks that are seeing a surge in traffic. For example, an illicit operation may detect a change in network behavior and try to cease/obfuscate their activities.

In particular, certain networks may be flagged as controllable (for example, operated by a friendly carrier) such that bandwidth allocations or other characteristically can be modified by sending a signal to the base station requesting more resources. Bulk data transfer may be prioritized across these networks.

Conversely, where a communication link is suspect or less control is available, the communication link can be assigned only error control functions (e.g., sending parity bits, error correction codes) as there may be potential third parties eavesdropping on the signal and a ramp up in data transfer could provide an unwanted indication of increased emergency services activities. However, the communication link may still be useful for a limited set of functionality, especially where connection quality amongst the other available connections is poor. Suspect connections can include connections where snooping or eavesdropping is likely, for example, through a suspiciously strong signal from a nearby cellphone tower that is above what should be expected given the distance and normative traffic levels (e.g., a "Stingray").

The provisioning of additional resources can be incorporated into a gradual "ramp" type approach to requesting new capabilities (as opposed to a "surge" all at once) such that the overall activity is not readily as apparent as a stepwise increase in bandwidth usage. For example, such a ramp up could happen across half an hour where bandwidth and/or other communication characteristics are modified. In an alternate embodiment, the provisioning of additional resources can also include "padding" with redundant or spurious packets in an attempt to obfuscate which communication link is being used for what purposes. For example, "dummy" packets may be generated and transmitted.

The system 1100 provisions the change in communications performance by modifying data routing paths. The change in communications performance is performed by adopting multi-path routing, for example, by bonding together multiple communication links and/or increasing the performance of the communication links by either requesting and/or obtaining more bandwidth, or assigning different roles for improving overall communications performance of the bonded communication links by, for example, modifying assignments in error control functions.

For example, system 1100 modifies data routing such that lower-priority communications are either disabled or have reduced communications ability by modifying their channel allocations. In some embodiments, lower-priority communications are moved to more congested channel allocations such that a free channel can be allocated to higher priority communications. Additional communications movements are possible to add additional signal separation for the priority communications.

In some embodiments, the modifying of the routing paths includes re-allocating network links previously allocated to the other networked devices and using the re-allocated network links for multi-path routing between the system 1100 and a communications station. For example, the system 1100 can indicate to a cellular base station tower that priority communications are required, and the cellular base station tower may reduce the capabilities temporarily for other users of the cellular base station tower to prioritize communications for system 1100. In some embodiments, the system 1100 transmits a signal indicating a request to monopolize communications or disrupt communications for other users of the cellular base station tower such that all of the communications are assigned to the system 1100. This can be useful, for example, where disruption of communications by particular individuals, such as arrest suspects may be desired.

The modifying of the data routing paths can include modifying assignments of error control roles and data transmission roles of the network links. Low-bandwidth, low latency or highly reliable network links are particularly useful for being assigned error control roles.

For example, an expensive but reliable satellite connection associated with the squad vehicle's portable communication device having limited bandwidth (e.g., 1 Mbps) can be re-assigned an error control role in relation to bulk data communications that may still occur through the other, less reliable, but higher bandwidth bonded connections (e.g., a combination of low performance cellular connections based on the system 1100's cellular communication antennas as well as the squad vehicle's portable device's cellular communication antennas).

In this example, the expensive but reliable satellite connection can be adapted for tracking whether packets have arrived, sending parity bits, sending frame numbers for frame alignment/re-ordering, re-transmitting suspected lost packets, sending cyclic redundancy check packets, among others.

The system 1100 is configured to generate a mapping of existing available communication links at a given location or set of locations and store the mapping in a data structure, the data structure being an array or a linked list, for example.

A multi-dimensional array or a relational database record may be populated. Characteristics of the available communication links can be stored thereon including, for example, signal strength, packet loss, uptime, latency, type, expected throughput, frequency band/channel, available overage, expandability/controllability, carrier, among others.

An initial mapping may include: Smartphone 1: LTE capability, 150 Mbps download/50 Mbps upload expandable to 200 Mbps download/100 Mbps upload if additional resources requested from Carrier 1, 15% capacity, currently being used for updating firmware (low priority); GSM Modem on Squad Vehicle: 3×LTE capability on Carrier 1, 2, and 3, respectively, 800 Mbps download/800 Mbps upload, Satellite Connection 1 on Squad Vehicle: Backup transmitter, 5 Mbps download/5 Mbps upload, non-reliance on cell towers means near 100% reliability outdoors; GSM Modem on second Squad Vehicle: 3×LTE capability on Carrier 1, 2, and 3, respectively, 800 Mbps download/800 Mbps upload. The mapping may also include connections being used by others (e.g., civilians in the vicinity, security cameras at stores).

As the police officer exits the first squad vehicle and begins pursuing the suspect, a body camera may be activated or a weapon drawn, which can automatically begin a request for increased communications services. The system 1100 recognizes a need to transmit a total of 1200 Mbps for all of the cameras associated with the officers and their vehicles. Bandwidth increase requests can be transmitted to cellular carriers to increase frequency slot allocations in relation to nearby base station towers.

The requests can be temporary and indicate, for example, an increase of 100 Mbps is required for a period of time. Initial allocations and increases thereof can be based on a pre-determined estimate based on the type of devices requiring communications and/or historical trends from tracked network usage in earlier emergency situations. In some embodiments, a type or severity of an accident or incident as flagged on system 1100 can be utilized to modify priority requests, such that, for example, a very high priority is established in the event of a major catastrophe or incident that may further add redundancy to communications in the event of a possible overload or additional congestion (e.g., looking for survivors after a building collapse).

Performance decreases are possible in relation to other users of the networks, and the system 1100 may dynamically update a new routing table with an updated mapping where communications are mapped to various interfaces and communication links, which may be bonded together, in some embodiments. The bonding may include the assignment of error control pathways and bulk data transmission roles to specific networks and communication links, which modifies how and what types of data packets are sent and when.

In some embodiments, prior to using a network or communication link flagged as not being able to be controlled or suspicious, the system 1100 adds encryption or obfuscation layers to the communication in an attempt to circumvent eavesdropping devices. Increased priority may be assigned to secure or known networks for bulk data transfer as additional time may not be needed for requiring encryption.

Where multiple squad vehicles are in pursuit or in communications proximity with one another, signals may also be shared amongst squad vehicles such that the squad vehicles form a mesh network whereby prioritized resources can utilize the shared resources of the pool of resources provided by the squad vehicles. For example, in a pursuit, resources may be prioritized to a dash camera of the lead vehicle, as well as IFF transponders for all of the vehicles, at the expense of the communication abilities of the dash cameras of all of the other vehicles (e.g., effectively reducing the bitrate of their communications).

Figure 12:
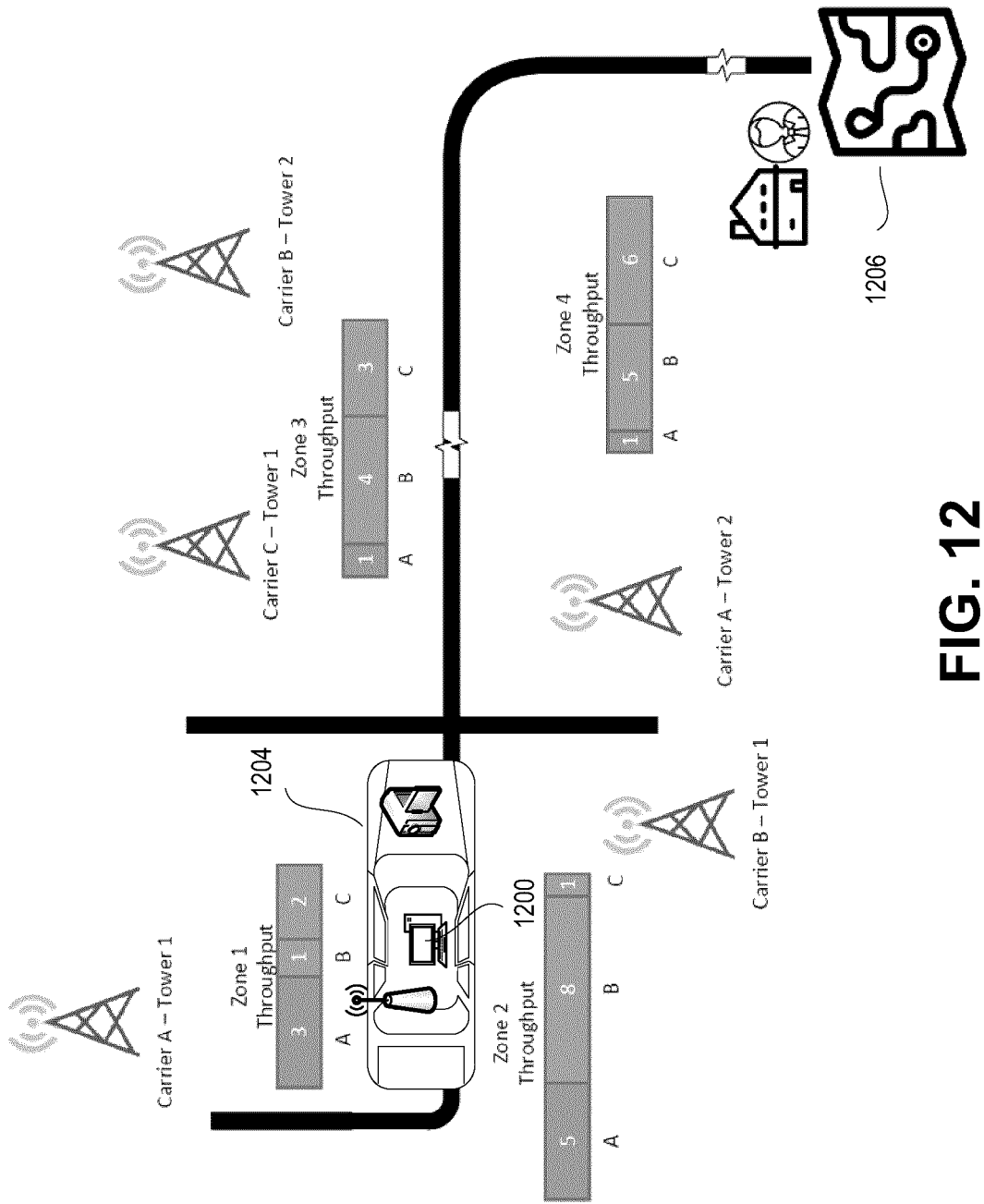
FIG. 12 is a second example illustration of a scenario for dynamically modifying multi-path routing communication pathways responsive to a triggering event, according to some embodiments.

FIG. 12 is a second example illustration of a scenario for dynamically modifying multi-path routing communication pathways responsive to a triggering event, according to some embodiments.

In this example, the communications coordination system 1200 is adapted to either be coupled to the squad vehicle 1204 such that the pathway of the squad vehicle 1204 is utilized for determining where and when communications need to be prioritized in a particular area or region 1206.

In this example, the change in communications performance is designated for target locations based on a route of a vehicle stored in electronic memory, and the modifying of the data routing paths associated with one or more other networked devices to prioritize communications between the target device and the communications station is pre-emptively conducted at the target locations while the vehicle is moving to the one or more target locations.

The on-board memory of the squad vehicle's navigation system is utilized to identify the region 1206 at which the squad vehicle is attending to, along with an estimated time required to arrive at the destination. In some embodiments, the communications coordination system 1200 pre-emptively prioritizes and modifies multi-path routing for the specific region 1206 such that by the time the squad vehicle arrives at the destination, communications have been cleared sufficiently to cause the increase in performance by utilizing multi-path routing.

Figure 13:
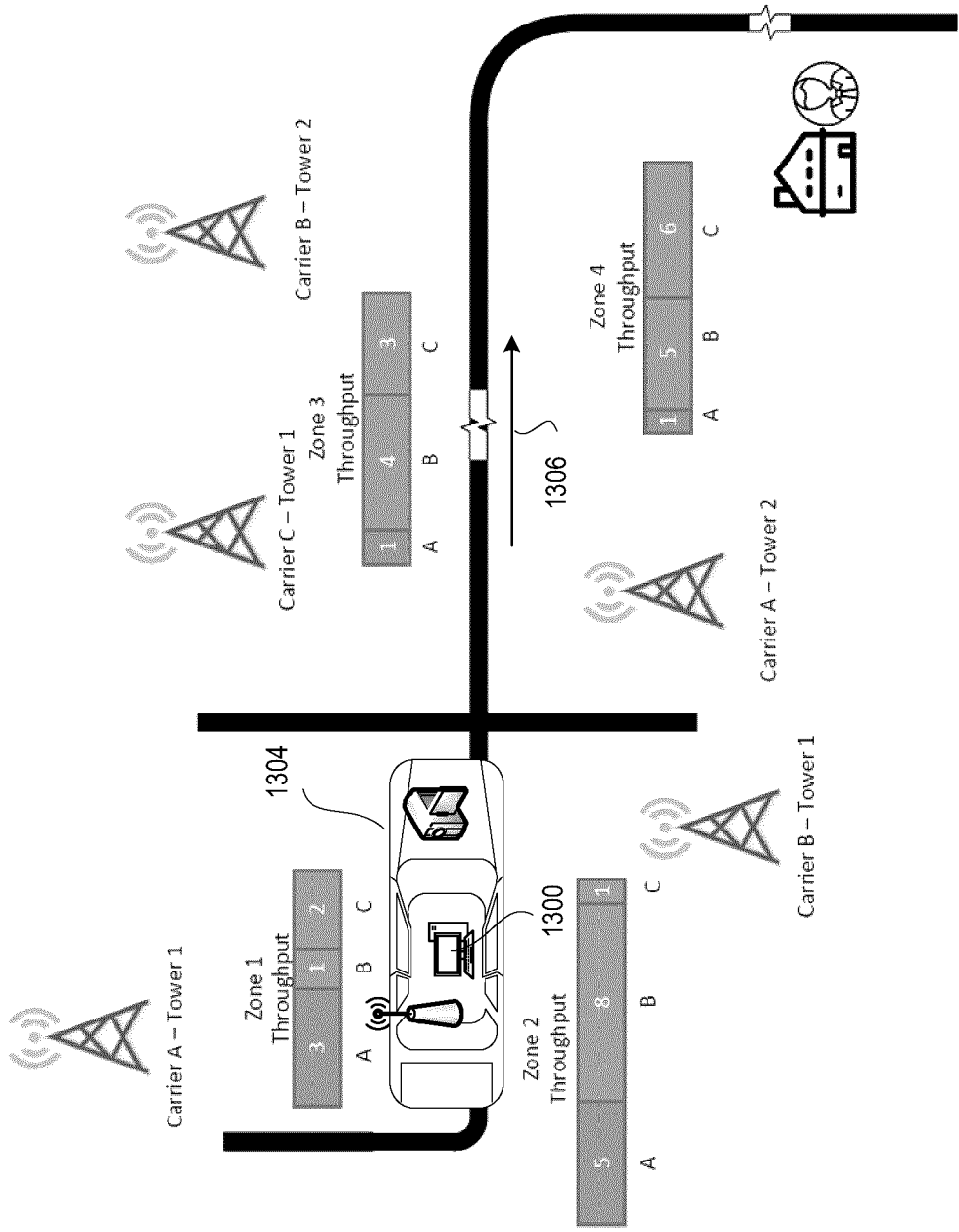
FIG. 13 is a third example illustration of a scenario for dynamically modifying multi-path routing communication pathways responsive to a triggering event, according to some embodiments.

FIG. 13 is a third example illustration of a scenario for dynamically modifying multi-path routing communication pathways responsive to a triggering event, according to some embodiments.

In this example, the communications coordination system 1300 is adapted to either be coupled to the squad vehicle 1304 such that the pathway of the squad vehicle 1304 is utilized for determining where and when communications need to be prioritized in a particular pathway 1306 during the times in which the squad vehicle 1304 is traversing the pathways. The triggering event, in this embodiment, can include the activation of emergency vehicle lighting, which is electronically coupled to and automatically indicates to the communications coordination system 1300 that prioritized communications are required for a period of time. The period of time can be determined such that at least while the emergency vehicle lighting is activated and for a timeout period afterwards (e.g., half an hour), that the prioritized communications are required.

As the squad vehicle 1304 traverses along the pathway, enhanced communications are provisioned accordingly by de-prioritizing and adding channel capability from various cellular base stations along the pathway. Movements between cellular towers and corresponding cells of a cellular network can be identified ahead of time, and pre-emptive modification can be based on a cell-by-cell basis and with corresponding base station communications thereof. For example, as the squad vehicle 1304 navigates between cells A, B, and C, communications are cleared sequentially and then de-prioritized after the squad vehicle 1304 exits the corresponding cells.

The on-board memory of the squad vehicle's navigation system is utilized to identify the pathway 1306 at which the squad vehicle is heading along, along with an estimated time at various locations along the pathway 1306. In some embodiments, the communications coordination system 1300 pre-emptively prioritizes and modifies multi-path routing for the specific region 1306 such that by the time the squad vehicle arrives at the locations along the pathway, communications have been cleared sufficiently to cause the increase in performance by utilizing multi-path routing. In this example, the prioritized communications may be required where the target transmission device is ultimately a dashboard camera which is transmitting footage of a police vehicle chase or the police vehicle using the emergency lights to bypass traffic lights. If there are additional squad vehicles, the squad vehicles may also form a mesh network of available pooled resources that may be utilized together to provide multi-path or bonded network connection links.

In a further embodiment, signal usage along the pathway or nearby regions can also be observed by communications coordination system 1300 (or a backend data center), for example, in communication with one or more cellular base stations. These communications and signal usage can be provided into an artificial intelligence engine that is configured to generate computer-aided predictions of possible outcomes of the incident in real-time or to mine the data to offer recommendations for improvements to incident responding protocols.

For example, the communications coordination system 1300 may use an artificial intelligence analysis engine to recommend and/or requisition a particular resource be available in an incident, based on a prediction of how the events in the incident timeline have played out in previous incidents based on their historical spectral and signal usages.

For example, the artificial intelligence analysis engine may recommend that a drone be sent to a particular location to provide a view of an incident not otherwise available, or to the location of an expected incident, for instance the predicted end point of a car chase (or where a getaway car or persons are located).

A further example may be the artificial intelligence analysis engine predicting the type of equipment or resource best suited to respond to a particular incident, such as predicting the need for a bomb sniffing dog or bomb robot where an explosive device is involved in the incident, or recommending the use of a particular form of non-lethal weapon based on an assessment of what a suspect is wearing.

In a specific example, the drone identifies that a bomb-planting suspect is wearing a gas mask (e.g., using machine learning). Accordingly, a non-lethal mechanism is automatically selected, and a control system selects a Taser rather than tear gas due to the presence of the gas mask.

In another aspect, the present system may also use an artificial intelligence analysis engine to determine whether gaps in data exist in the timelines of incidents located in particular areas, and may recommend changes to communication networks or may identify locations suitable for additional fixed communication devices, such as surveillance cameras. The artificial intelligence analysis engine may also be used to analyze and compare events to standard workflows or similar past events to extract statistics and insights that can drive workflow improvements and opportunities for training improvements for staff in the field.

Other examples are possible—the above examples are utilized to indicate example scenarios whereby the communications are prioritized and/or de-prioritized to establish improved communications performance. This is particularly important in relation to rural or mountainous regions, where a single communications interface is suffering from spectral interference or poor signal quality, especially if there is congestion in the network.

The ability to provide enhanced communications despite such spectral interference or poor signal quality allows for improved communications coordination with an emergency responder. The communications, for example, can be with a data center of a police station where such dashboard or body camera images are captured in real or near-real time (or in some embodiments, proximate enough to the event) such that tampering or accidental loss is reduced. For example, in some embodiments, dashboard or body camera images may also be stored on local storage (e.g., at a higher resolution), but a corroborating version (e.g., at a lower resolution, bitrate, frame rate) of the dashboard or body camera images are transmitted to the base station, for example, to relay real or near-real time intelligence to the police station where activities are being coordinated. Even if the local storage is corrupted, at least the corroborating version is available.

The embodiments are not limited to emergency responders, but the system could also be used for other types of triggering events, such as those used in heart rate sensors for monitoring seniors, sports events (e.g., ball tracking and triggers can be based on detected in-game events), concerts, among others.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for dynamically modifying multi-path routing communication pathways responsive to a triggering event, the system comprising:
    a sensor communications receiver in electronic communication with one or more sensors and configured to receive one or more data sets associated with the triggering event;
    a network communications controller device including at least a processor, the network communications controller device for communication with the sensor communications receiver and configured to determine a required change in communications performance relative to current communications performance for a target device; and
    the network communications controller device configured to provision the change in communications performance by modifying one or more data routing paths associated with one or more other networked devices to prioritize or deprioritize communications between the target device and a communications station;
    where in the modifying of the one or more data routing paths includes re-allocating network links previously allocated to the one or more other networked devices and using the re-allocated network links for multi-path routing between the target device and a communications station; and wherein the modifying of the one or more data routing paths associated with the one or more other networked devices includes temporarily disabling communications from a subset of the one or more other networked devices by re-allocating an entirety of the corresponding network links of the subset of the one or more other networked devices to the target device.

2. The system of claim 1, wherein the multi-path routing between the target device and the communications station includes bonding of two or more communication channels.

3. The system of claim 1, wherein the modifying of the one or more data routing paths includes modifying assignments of error control roles and data transmission roles of the one or more network links.

4. The system of claim 3, wherein the one or more other network devices includes a portable cellular router, the portable cellular router electronically coupled to the target device through a local area network connection; and
wherein the one or more data routing paths associated with the cellular router are assigned error control roles.

5. The system of claim 1, wherein the sensor communications receiver receives at least a second one or more data sets associated with at least a second triggering event;
wherein the modifying of the one or more data routing paths associated with one or more other networked devices includes prioritizing the triggering events into at least one lower priority triggering event and at least one higher priority triggering event; and
wherein communication performance relating to the at least one higher priority triggering event are prioritized and communication performance relating to the at least one lower priority triggering event are de-prioritized.

6. The system of claim 2, wherein the modifying of the one or more data routing paths associated with one or more other networked devices includes transmitting a data message to one or more cellular base stations including electronic instructions to re-allocate one or more cellular communications vectors to provide the changed communications performance.

7. The system of claim 1, wherein the required change in communications performance is designated for one or more target locations based on a route of a vehicle stored in electronic memory, and the modifying of the one or more data routing paths associated with one or more other networked devices to prioritize communications between the target device and the communications station is preemptively conducted at the one or more target locations while the vehicle is moving to the one or more target locations.

8. The system of claim 1, wherein the required change in communications performance is designated for a route of a vehicle or a person stored in electronic memory, and the modifying of the one or more data routing paths associated with one or more other networked devices to prioritize communications between the target device and the communications station includes modifying the one or more data routing paths corresponding to subsets of the one or more other networked devices that are proximate to the vehicle or the person while the vehicle or the person is traversing the route.

9. The system of claim 1, wherein the one or more sensors include at least one of a weapon securement device sensor or an emergency vehicle lighting activation sensor, and the target device includes at least one of a body camera, an identification friend or foe transponder, or a dashboard camera.

10. The system of claim 1, wherein the target device is adapted to record both a low bandwidth data stream and a high bandwidth data stream, the low bandwidth data stream being transmitted through the one or more data routing paths and the high bandwidth data stream being stored on local data storage or local computer memory.

11. A computer implemented method for dynamically modifying multi-path routing communication pathways responsive to a triggering event, the method comprising:
receiving one or more data sets associated with the triggering event;
determining a required change in communications performance relative to current communications performance for a target device; and
provisioning the change in communications performance by modifying one or more data routing paths associated with one or more other networked devices to prioritize or deprioritize communications between the target device and a communications station;
wherein the modifying of the one or more data routing paths includes re-allocating network links previously allocated to the one or more other networked devices and using the re-allocated network links for multi-path routing between the target device and a communications station; and
wherein the modifying of the one or more data routing paths associated with one or more other networked devices includes temporarily disabling communications from a subset of the one or more other networked devices by re-allocating an entirety of the corresponding network links of the subset of the one or more other networked devices to the target device.

12. The method of claim 11, wherein the multi-path routing between the target device and the communications station includes bonding of two or more communication channels.

13. The method of claim 11, wherein the modifying of the one or more data routing paths includes modifying assignments of error control roles and data transmission roles of the one or more network links.

14. The method of claim 13, wherein the one or more other network devices includes a portable cellular router, the portable cellular router electronically coupled to the target device through a local area network connection; and
wherein the one or more data routing paths associated with the cellular router are assigned error control roles.

15. The method of claim 11, wherein the method further comprises:
receiving at least a second one or more data sets associated with at least a second triggering event;
wherein the modifying of the one or more data routing paths associated with one or more other networked devices include prioritizing the triggering events into at least one lower priority triggering events and at least one higher priority triggering event, and
where communication performance relating to the at least one higher priority triggering event are prioritized and communication performance relating to the at least one lower priority triggering event are de-prioritized.

16. The method of claim 11, wherein the modifying of the one or more data routing paths associated with one or more other networked devices includes transmitting a data message to one or more cellular base stations including electronic instructions to re-allocate one or more cellular communications vectors to provide the changed communications performance.

17. The method of claim 11, wherein the required change in communications performance is designated for one or more target locations based on a route of a vehicle stored in electronic memory, and the modifying of the one or more data routing paths associated with one or more other networked devices to prioritize communications between the target device and the communications station is pre emptively conducted at the one or more target locations while the vehicle is moving to the one or more target locations.

18. The method of claim 11, wherein the required change in communications performance is designated for a route of a vehicle or a person stored in electronic memory, and the modifying of the one or more data routing paths associated with one or more other networked devices to prioritize communications between the target device and the communications station includes modifying the one or more data routing paths corresponding to subsets of the one or more other networked devices that are proximate to the vehicle or the person while the vehicle or the person is traversing the route.

19. The method of claim 11, wherein the one or more sensors include at least one of a weapon securement device sensor or an emergency vehicle lighting activation sensor, and the target device includes at least one of a body camera, an identification friend or foe transponder, or a dashboard camera.

20. A non-transitory computer readable medium storing machine interpretable instructions, which when executed, cause a processor to perform a method for dynamically modifying multi-path routing communication pathways responsive to a triggering event, the method comprising:
  receiving one or more data sets associated with the triggering event;
  determining a required change in communications performance relative to current communications performance for a target device; and
  provisioning the change in communications performance by modifying one or more data routing paths associated with one or more other networked devices to prioritize or deprioritize communications between the target device and a communications station;
  wherein the modifying of the one or more data routing paths includes re-allocating network links previously allocated to the one or more other networked devices and using the re-allocated network links for multi-path routing between the target device and a communications station; and
  wherein the modifying of the one or more data routing paths associated with one or more other networked devices includes temporarily disabling communications from a subset of the one or more other networked devices by re-allocating an entirety of the corresponding network links of the subset of the one or more other networked devices to the target device.

* * * * *

UNITED STATES PATENT AND TRADEMARK OFFICE
CERTIFICATE OF CORRECTION

| | |
|---|---|
| PATENT NO. | : 11,589,289 B2 |
| APPLICATION NO. | : 17/264769 |
| DATED | : February 21, 2023 |
| INVENTOR(S) | : Bogdan Frusina et al. |

It is certified that error appears in the above-identified patent and that said Letters Patent is hereby corrected as shown below:

In the Specification

Column 1 Lines 8 to 26:
"This application is a non-provisional of, U.S. Application No. 62/711,989, entitled "SYSTEM AND METHOD TO ADAPT COMMUNICATIONS RESPONSIVE TO ACTIONABLE INTELLIGENCE", filed 30-Jul-2018 and also a continuation-in-part application of U.S. Patent Application Serial No. 16/023406, entitled "A SYSTEM AND METHOD FOR TRANSMISSION OF DATA FROM A WIRELESS MOBILE DEVICE OVER A MULTIPATH WIRELESS ROUTER ", filed on 29-Jun-2018, which is a continuation of U.S. Application No. 14/616,060, filed February 6, 2015, which is a continuation of U.S. Application No. 14/114,984, filed October 31, 2013, which is the National Stage of International Application No. PCT/IB2013/000690, filed April 16, 2013; which is a continuation-in-part of U.S. Application No. 13/446,825, filed April 13, 2012, which is a continuation-in-part of U.S. Application No. 13/183,652, filed July 15, 2011, which claims the benefit of U.S. Provisional Application No. 61/364,598, filed July 15, 2010. The contents of each of these related applications are hereby incorporated by reference."

Should read:
-- This application is a 371 U.S. National Stage Application of PCT Application No. PCT/CA2019/051039, which claims the benefit of priority to U.S. Application No. 62/711,989, entitled "SYSTEM AND METHOD TO ADAPT COMMUNICATIONS RESPONSIVE TO ACTIONABLE INTELLIGENCE", filed 30-Jul-2018. The contents of each of these related applications are hereby incorporated by reference. --

Signed and Sealed this
Sixth Day of June, 2023

Katherine Kelly Vidal
*Director of the United States Patent and Trademark Office*